United States Patent
Chung

(10) Patent No.: US 10,606,362 B2
(45) Date of Patent: Mar. 31, 2020

(54) TERMINAL DEVICE AND CONTROL METHOD

(71) Applicant: LG ELECTRONICS INC., Seoul (KR)

(72) Inventor: Sooyon Chung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/780,105

(22) PCT Filed: Dec. 1, 2015

(86) PCT No.: PCT/KR2015/012954
§ 371 (c)(1),
(2) Date: May 30, 2018

(87) PCT Pub. No.: WO2017/094926
PCT Pub. Date: Jun. 8, 2017

(65) Prior Publication Data
US 2018/0348881 A1    Dec. 6, 2018

(51) Int. Cl.
*G06F 3/01* (2006.01)
*G06F 3/0481* (2013.01)
(Continued)

(52) U.S. Cl.
CPC ............ *G06F 3/017* (2013.01); *G06F 1/1652* (2013.01); *G06F 3/0482* (2013.01);
(Continued)

(58) Field of Classification Search
CPC ...... G06F 3/017; G06F 3/0488; G06F 3/0482; G06F 3/048; G06F 3/01; G06F 1/1652;
(Continued)

(56) References Cited

U.S. PATENT DOCUMENTS 5,534,888 A * 7/1996 Lebby ................... G06F 1/1616
345/672
6,771,232 B2 * 8/2004 Fujieda ................. G06F 1/1615
345/30

(Continued)

FOREIGN PATENT DOCUMENTS

KR    10-2010-0019164 A    2/2010
KR    10-2011-0112943 A    10/2011
(Continued)

*Primary Examiner* — Grant Sitta
(74) *Attorney, Agent, or Firm* — Birch, Stewart, Kolasch & Birch, LLP

(57) ABSTRACT

A terminal device and a control method are disclosed. The terminal device comprising a display transparent cover comprises: a communication unit for communicating with an external device; a rollable display unit stored in a housing and exposed from the housing; a sensing unit for sensing a gesture input on the display transparent cover; and a controller, wherein the rollable display unit has, when stored in the housing, an indicating region seen to the outside through the display transparent cover and displays indicating information in the indicating region, and the controller displays notification information about received data in the indicating region in the case of receiving the data through the communication unit, and can move the displayed notification information to an extended first region if the rollable display unit extends a preset first length or more.

18 Claims, 21 Drawing Sheets

(a)                    (b)

(51) Int. Cl.
*G06F 3/0488* (2013.01)
*G06F 3/0485* (2013.01)
*G06F 1/16* (2006.01)
*H04W 88/02* (2009.01)
*G06F 3/0482* (2013.01)

(52) U.S. Cl.
CPC .......... *G06F 3/0485* (2013.01); *G06F 3/0488* (2013.01); *G06F 3/04817* (2013.01); *G06F 3/04883* (2013.01); *H04W 88/02* (2013.01); *G06F 2203/04102* (2013.01); *G06F 2203/04803* (2013.01)

(58) Field of Classification Search
CPC ............... G06F 3/0485; G06F 3/04883; G06F 3/04817; G06F 2203/04803; G06F 2203/04102; H04W 88/02
See application file for complete search history.

(56) References Cited

U.S. PATENT DOCUMENTS

| | | | | |
|---|---|---|---|---|
| 8,581,939 | B2 * | 11/2013 | Abe | G06F 1/1624 345/1.3 |
| 9,830,075 | B2 * | 11/2017 | Kim | G06F 3/04817 |
| 2003/0071800 | A1 * | 4/2003 | Vincent | G02F 1/15 345/204 |
| 2003/0119562 | A1 * | 6/2003 | Kokubo | H04M 1/72522 455/566 |
| 2004/0198457 | A1 * | 10/2004 | Hayashida | H04M 1/72522 455/566 |
| 2006/0061555 | A1 * | 3/2006 | Mullen | G06F 1/1624 345/169 |
| 2008/0150885 | A1 * | 6/2008 | Overwijk | G02F 1/1391 345/107 |
| 2010/0033435 | A1 * | 2/2010 | Huitema | G06F 1/1615 345/173 |
| 2011/0216064 | A1 * | 9/2011 | Dahl | G06F 1/1616 345/428 |
| 2013/0201208 | A1 * | 8/2013 | Cho | G06F 3/1431 345/619 |
| 2013/0275910 | A1 * | 10/2013 | Kim | G06F 3/0484 715/800 |
| 2013/0314762 | A1 * | 11/2013 | Kwack | G02F 1/09 359/280 |
| 2014/0160078 | A1 * | 6/2014 | Seo | G06F 3/017 345/175 |
| 2014/0189583 | A1 * | 7/2014 | Yang | G06F 1/3234 715/800 |
| 2014/0204037 | A1 * | 7/2014 | Kim | G06F 1/1647 345/173 |
| 2014/0223343 | A1 | 8/2014 | Lee et al. | |
| 2014/0325431 | A1 * | 10/2014 | Vranjes | G06F 3/0481 715/788 |
| 2014/0333545 | A1 * | 11/2014 | Lee | G06F 1/1643 345/173 |
| 2014/0340299 | A1 * | 11/2014 | Lee | G06F 1/1652 345/156 |
| 2015/0133193 | A1 * | 5/2015 | Stotler | G06F 1/163 455/557 |
| 2015/0227223 | A1 * | 8/2015 | Kang | G06F 3/0487 345/173 |
| 2015/0248200 | A1 * | 9/2015 | Cho | G06F 3/0482 715/773 |
| 2015/0378557 | A1 * | 12/2015 | Jeong | G06F 1/1626 715/835 |
| 2016/0033999 | A1 * | 2/2016 | Browning | G06F 1/1652 345/667 |
| 2016/0196014 | A1 * | 7/2016 | Qiao | G06F 3/0482 715/765 |
| 2017/0061932 | A1 * | 3/2017 | Kwon | G06F 1/1626 |
| 2017/0147189 | A1 * | 5/2017 | Ryu | G06F 1/1652 |
| 2017/0168769 | A1 * | 6/2017 | Jeon | G06F 3/04817 |
| 2017/0308346 | A1 * | 10/2017 | Lee | G06F 3/14 |
| 2018/0101297 | A1 * | 4/2018 | Yang | H04M 1/72522 |
| 2019/0012008 | A1 * | 1/2019 | Yoon | G06F 3/041 |

FOREIGN PATENT DOCUMENTS

| | | |
|---|---|---|
| KR | 10-2014-0062280 A | 5/2014 |
| KR | 10-2014-0100149 A | 8/2014 |

* cited by examiner

FIG. 13
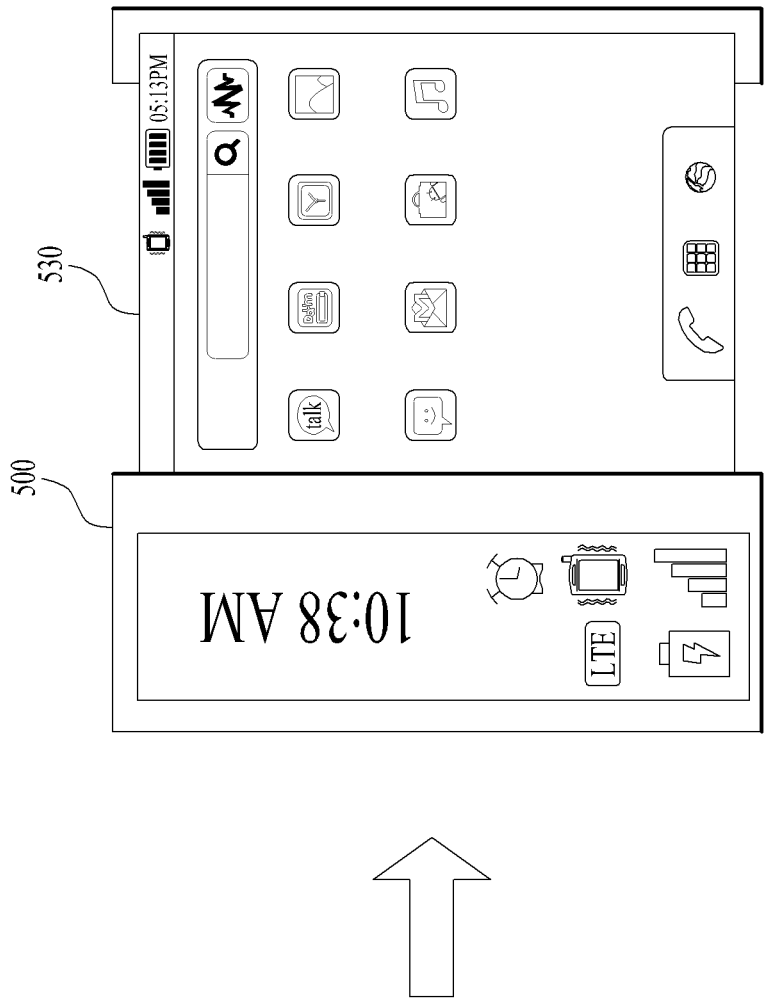
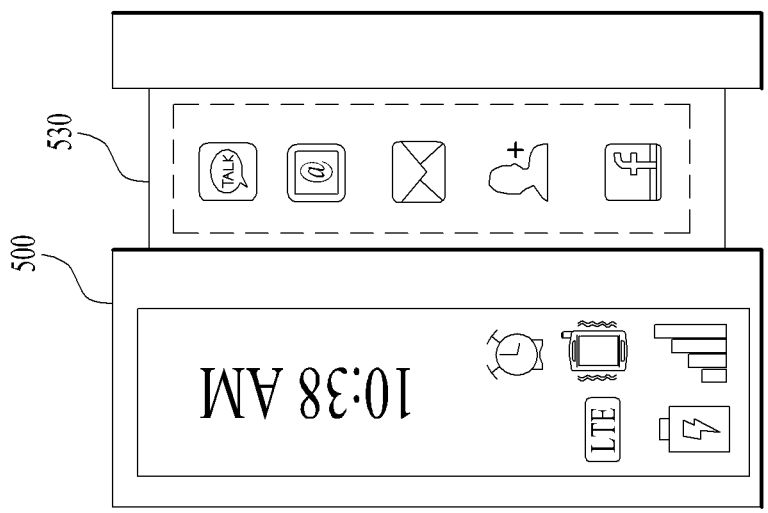

FIG. 19
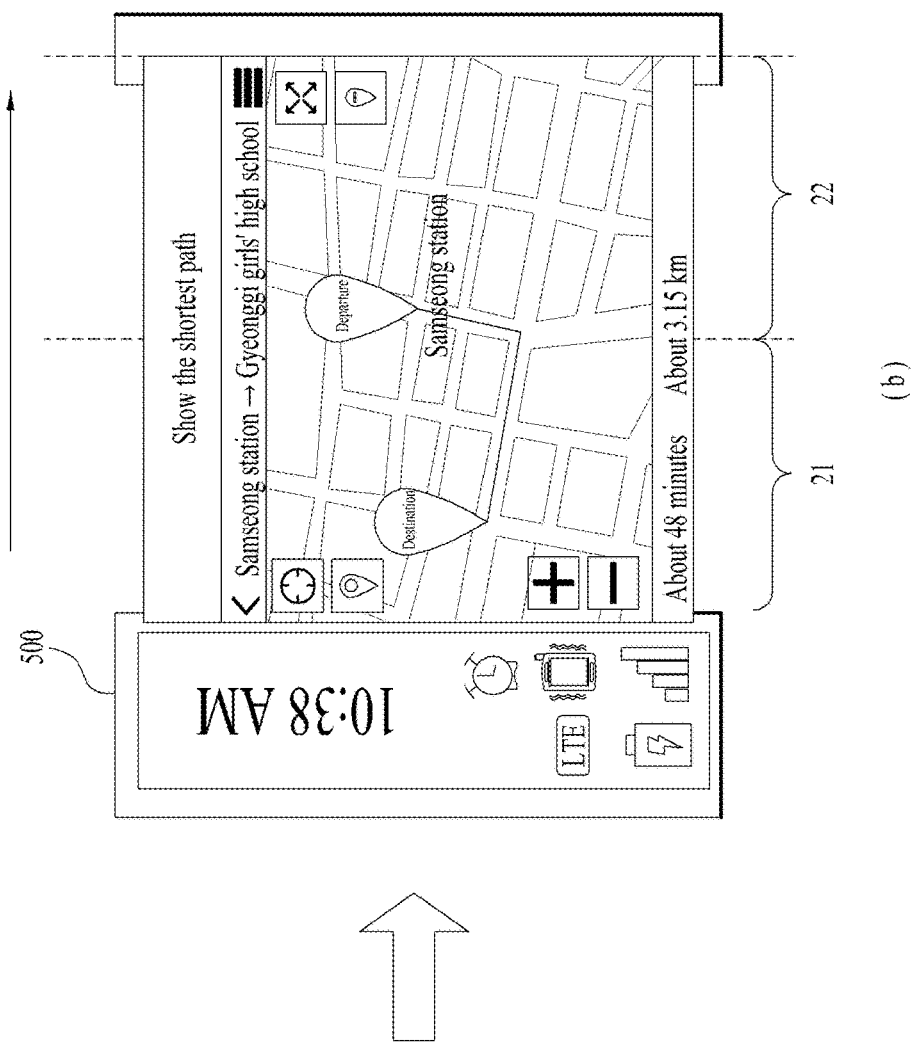
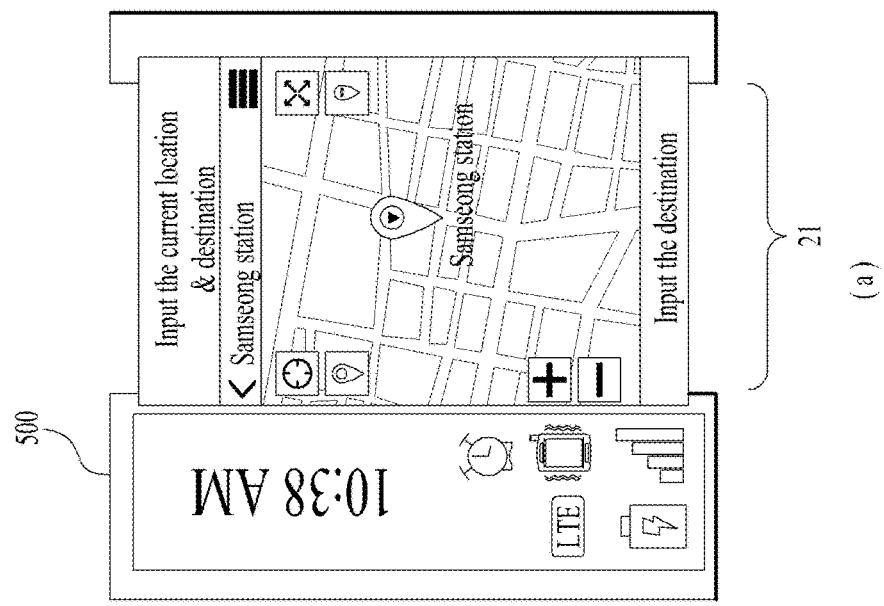

FIG. 20
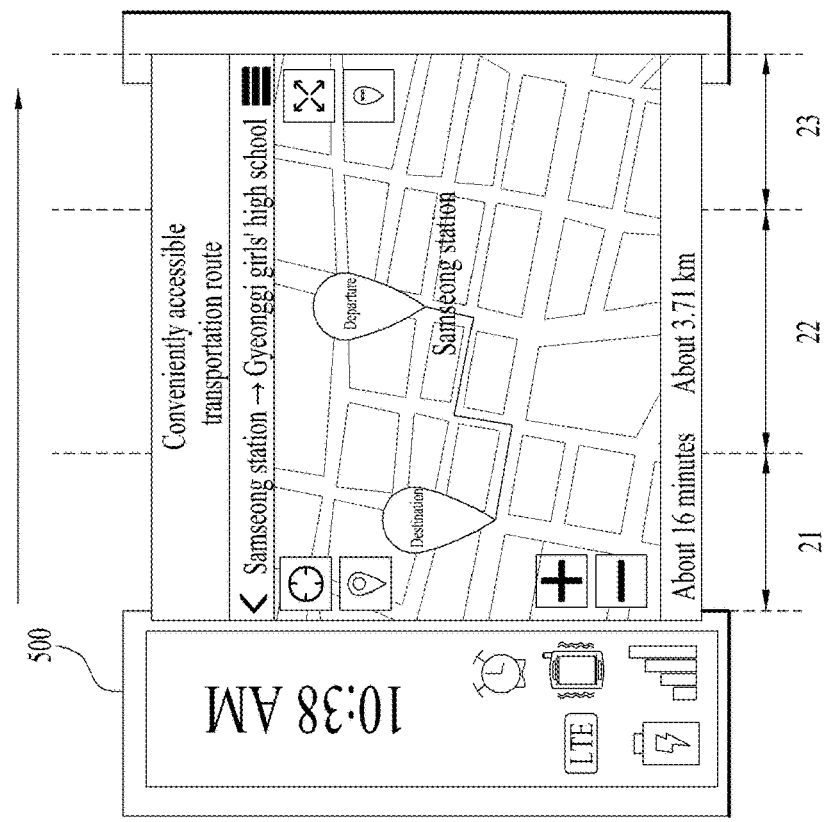
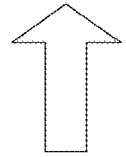
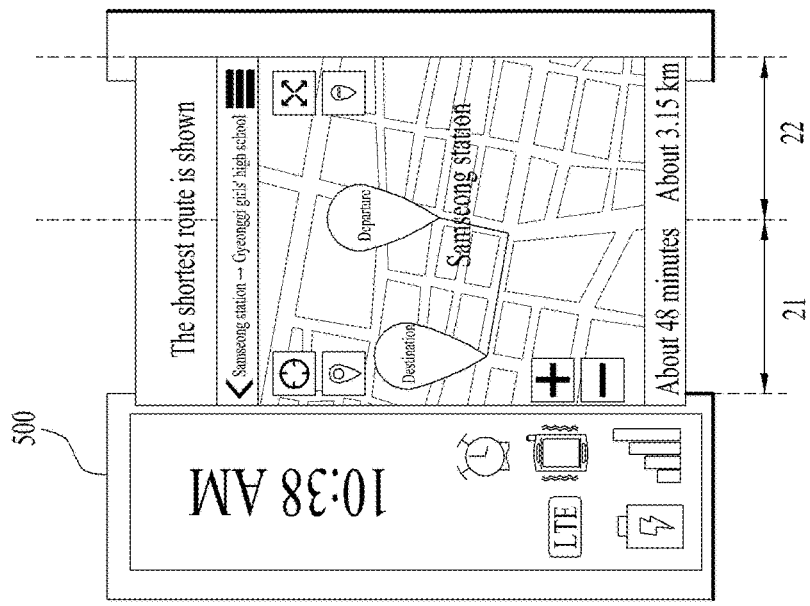

FIG. 21
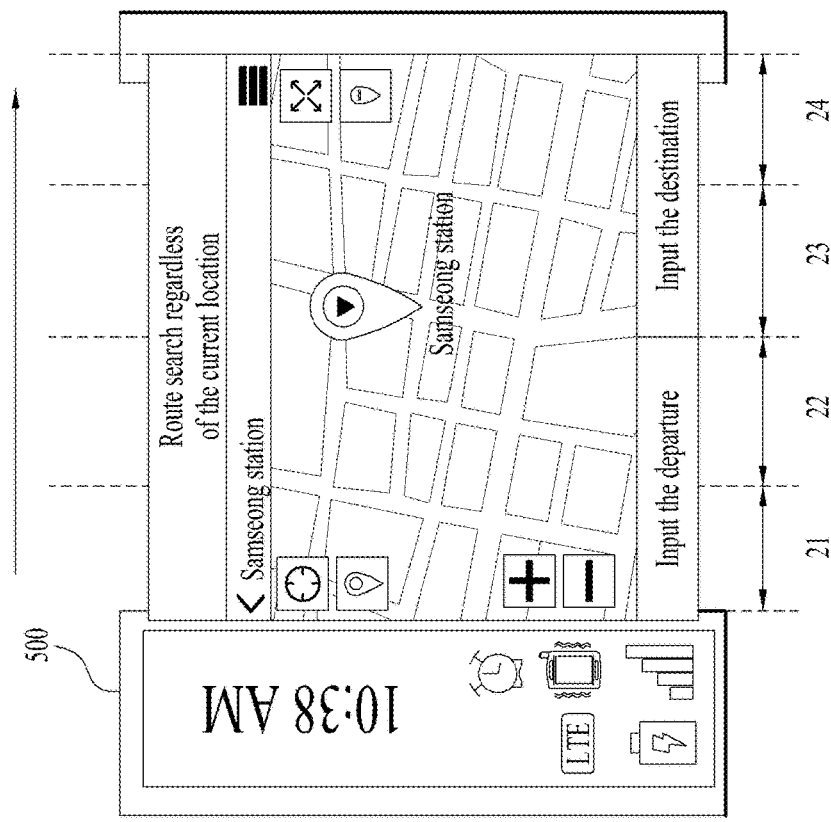
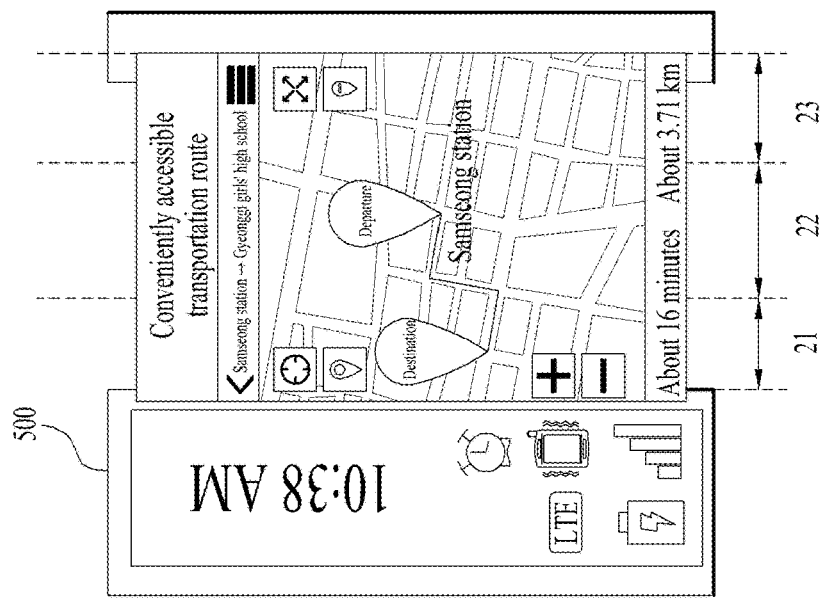

TERMINAL DEVICE AND CONTROL METHOD

TECHNICAL FIELD

The present invention relates to a terminal device and control method therefor.

BACKGROUND ART

Generally, terminals can be classified into mobile/portable terminals and stationary terminals according to their mobility. The mobile terminals can be further classified into handheld terminals and vehicle mount terminals according to possibility of user's direct portability.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. Recently, mobile terminals are developed to be able to receive multicast signals including visual content such as videos and television programs.

As the functions of the terminal are diversified, the terminal is implemented as a multimedia player with multiple functions of capturing images or videos, playing music or video files, gaming, and receiving broadcasting programs.

Efforts are ongoing to support and increase the functionality of the mobile terminal. Such efforts include software and hardware improvements as well as changes and improvements in the structural components.

Currently, researches are being carried out to develop a terminal with a rollable display. Thus, it is also necessary to develop UI/UX that enables users to conveniently use the rollable display.

DISCLOSURE OF THE INVENTION

Technical Tasks

Accordingly, an object of the present invention is to address the above-noted and other problems. Another object of the present invention is to a terminal capable of displaying information step by step by spreading a rollable display and control method thereof.

It will be appreciated by persons skilled in the art that the objects that could be achieved with the present invention are not limited to what has been particularly described hereinabove and the above and other objects that the present invention could achieve will be more clearly understood from the following detailed description

Technical Solutions

To achieve these objects and other advantages, in an aspect of the present invention, provided herein is a terminal with a transparent display cover, including: a communication unit configured to perform communication with an external device; a rollable display unit configured to be stored in a housing and exposed from the housing; a sensing unit configured to sense gestures inputted on the transparent display cover; and a controller. In this case, when being stored in the housing, the rollable display unit may be configured to expose an indicating area to the outside through the transparent display cover and display indicating information in the indicating area. In addition, the controller may be configured to: when receiving data through the communication unit, display notification information of the received data in the indicating area; and when the rollable display unit is extended by a first predetermined length or more, move the displayed notification information into a first extension area.

When the displayed notification information is selected and when the rollable display unit is extended by a second length or more, which is greater than the first length, the controller may be configured to execute an application related to the selected notification information and display first sub data of the executed application in a second extension area.

When the rollable display unit is extended by a third length or more, which is greater than the second length, the controller may be configured to display second sub data subordinate to the first sub data in a third extension area.

When the rollable display unit is extended by a fourth length or more, which is greater than the third length, the controller may be configured to display third sub data subordinate to the second sub data in a fourth extension area.

The rollable display unit may be configured to display time information in the indicating area and, when the notification information is displayed, display the time information by adjusting size of the time information.

When receiving as an input a swipe gesture selecting the notification information and then moving in a first direction in the indicating area and on the transparent display cover, the controller may be configured to control the rollable display unit to delete the selected notification information.

When receiving as an input a swipe gesture moving in a second direction in the indicating area and on the transparent display cover, the controller may be configured to control the rollable display unit to display additional notification information that has not been displayed.

When receiving as an input a swipe gesture moving in a third direction in the indicating area and on the transparent display cover, the controller may be configured to control the rollable display unit to display a predetermined application list.

The controller may be configured to control the rollable display unit to display a list switch menu in the indicating area and, whenever the displayed list switch menu is selected, control the rollable display unit to display the predetermined application list and a recently used list in an alternate manner.

When the rollable display unit is extended by a predetermined length or more without selection of the notification information, the controller may be configured to control the rollable display unit to display a predetermined screen.

The predetermined length may be a maximum extension length of the rollable display unit, and the predetermined screen may be a home screen.

When a predetermined application is selected and when the rollable display unit is extended by a second length or more, which is greater than the first length, the controller may be configured to control the rollable display unit to display first content of the selected application in the first extension area and a second extension area.

When the rollable display unit is extended by a third length or more, which is greater than the second length, the controller may be configured to control the rollable display unit to display second content of the selected application in the first extension area to a third extension area.

When the rollable display unit is extended by a fourth length or more, which is greater than the third length, the controller may be configured to control the rollable display unit to display third content of the selected application in the first extension area to a fourth extension area.

In another aspect of the present invention, provided herein is a method of controlling a terminal with a transparent display cover, including: when a rollable display unit is stored in a housing, exposing an indicating area to the outside through the transparent display cover and displaying indicating information in the indicating area; when data is received, displaying notification information of the received data in the indicating area; and when the rollable display unit is extended by a first predetermined length or more, moving the displayed notification information into a first extension area.

The method may further include, when the displayed notification information is selected and when the rollable display unit is extended by a second length or more, which is greater than the first length, executing an application related to the selected notification information and displaying first sub data of the executed application in a second extension area.

The method may further include, when a swipe gesture selecting the notification information and then moving in a first direction in the indicating area and on the transparent display cover is received as an input, deleting the selected notification information.

The method may further include, when a swipe gesture moving in a second direction in the indicating area and on the transparent display cover is received as an input, displaying additional notification information that has not been displayed.

The method may further include, when a swipe gesture moving in a third direction in the indicating area and on the transparent display cover is received as an input, displaying a predetermined application list.

The method may further include, when the rollable display unit is extended by a predetermined length or more without selection of the notification information, displaying a predetermined screen.

Advantageous Effects

The mobile terminal and control method thereof according to the present invention has the following effects and/or advantages.

According to at least one embodiment of the present invention, it is possible to display information step by step by extending the rollable display.

In addition, according to at least one embodiment of the present invention, it is possible to execute various menus by extending the rollable display.

Moreover, according to at least one embodiment of the present invention, the type and size of information displayed in the indicating area can be appropriately adjusted.

DESCRIPTION OF DRAWINGS

FIG. 13 is a diagram illustrating an embodiment of displaying a home screen on the rollable display unit.

FIG. 19 is a diagram illustrating an embodiment of executing various menus in a second extension area of the rollable display unit.

FIG. 20 is a diagram illustrating an embodiment of executing various menus in a third extension area of the rollable display unit.

FIG. 21 is a diagram illustrating an embodiment of executing various menus in a fourth extension area of the rollable display unit.

BEST MODE FOR INVENTION

Hereinafter, a description will be given in detail of embodiments disclosed herein with reference to the accompanying drawings. For the sake of brief description with reference to the drawings, the same or equivalent components may be provided with the same reference numbers regardless of drawing numbers, and description thereof will not be repeated. Suffixes such as "module", "unit" and the like in this disclosure may be used to refer to elements or components. Use of such a suffix herein is merely intended to facilitate description of the specification, and both suffixes may be interchangeably usable. In addition, if it is determined that the description of the known prior art obscures the gist of the embodiments disclosed in the present specification, the detailed description thereof will be omitted. Moreover, it should be understood that all changes, equivalents, and substitutes that do not depart from the spirit and technical scope of the present invention are encompassed in the present invention.

The description with ordinal numbers such as 'first ~', 'second ~' and the like is provided to facilitate the description of the corresponding terminologies only, which is non-limited by such terminologies or ordinal numbers. These terms are generally only used to distinguish one element from another.

It will be understood that when an element is referred to as being "connected with" or "accessed by" another element, the element can be directly connected with or accessed by the other element, or intervening elements may also be present. In contrast, when an element is referred to as being "directly connected with" or "directly accessed by" another element, there are no intervening elements present.

A singular representation may include a plural representation unless it represents a definitely different meaning from the context.

In this specification, it should be understood that terms such as "comprise", "include" or "have" are intended to indicate an existence of features, numbers, steps, operations, elements, items or any combination thereof disclosed in the specification, but the terms are not intended to exclude an existence of one or more other features, numbers, steps, operations, elements, or any combination thereof or possibility of adding those things.

Mobile terminals presented herein may include cellular phones, smart phones, laptop computers, digital broadcast terminals, personal digital assistants (PDAs), portable multimedia players (PMPs), navigators, slate PCs, tablet PCs, ultrabooks, wearable devices (for example, smartwatches, smart glasses, head mounted displays (HMDs)), and the like.

By way of non-limiting example only, further description will be made with reference to particular types of mobile terminals. However, such teachings apply equally to other types of stationary terminals such as digital TVs, desktop computers, digital signage players and the like.

Figure 1A:
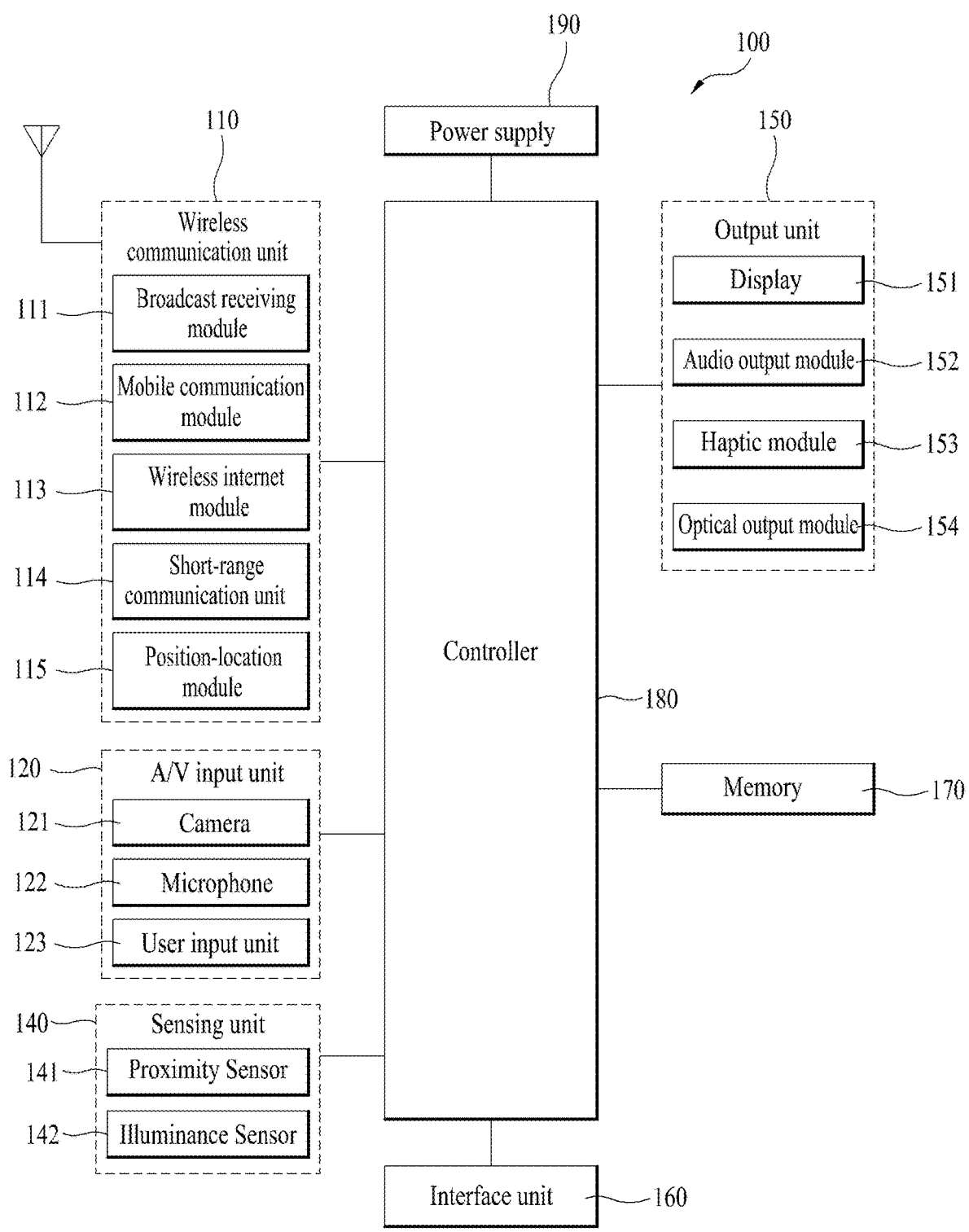
FIG. 1A is a block diagram for explaining a terminal according to the present invention.
Figure 1B:
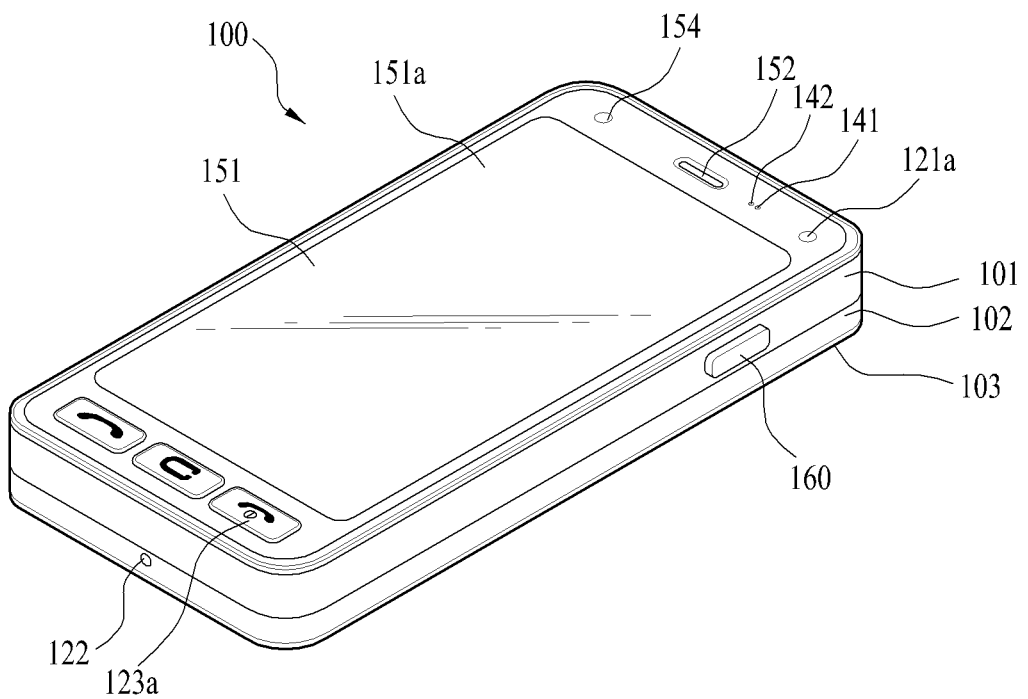
FIGS. 1B and 1C are conceptual views of an exemplary terminal according to the present invention, viewed from different directions.
Figure 1C:
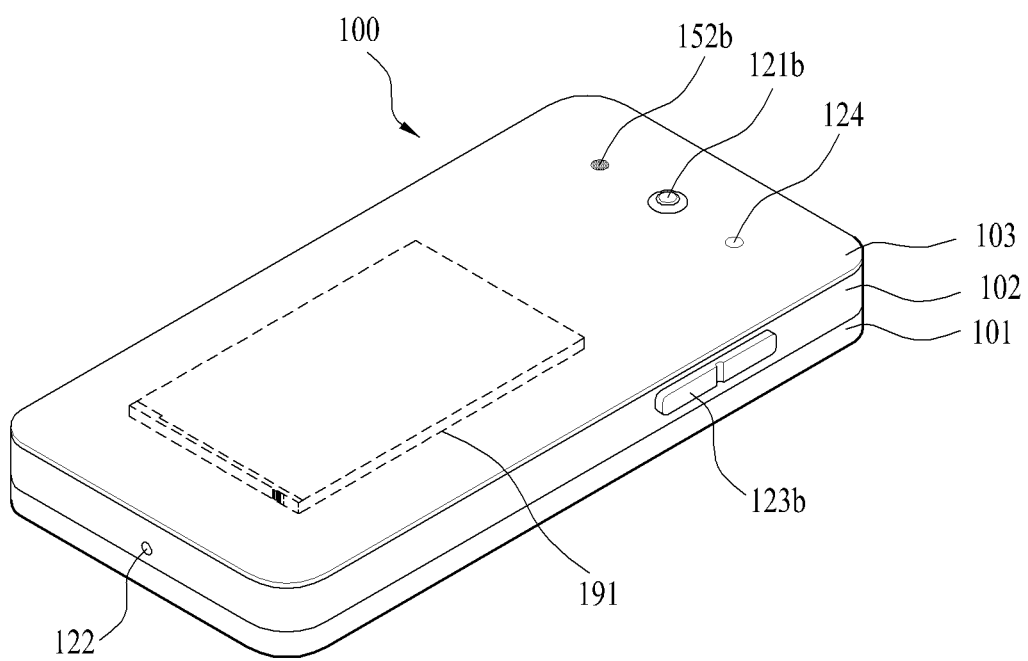

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented. Referring now to FIG. 1A, the mobile terminal 100 is shown having wireless communication unit 110 configured with several commonly implemented components.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a position location module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 processes signals, data, information and the like inputted or outputted through the above-mentioned components and/or runs application programs saved in the memory 170, thereby processing or providing a user with appropriate information and/or functions.

The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIG. 1A according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least one portion of the respective components mentioned in the foregoing description can cooperatively operate to embody operations, controls or controlling methods of the mobile terminal according to various embodiments of the present invention mentioned in the following description. Moreover, the operations, controls or controlling methods of the mobile terminal can be embodied in the mobile terminal by running at least one or more application programs saved in the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The position-location module 115 is generally configured to detect, calculate, derive or otherwise identify a position of the mobile terminal. As an example, the position-location module 115 includes a Global Position System (GPS) module, a Wi-Fi module, or both. If desired, the position-location module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 100. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 can receive external power or provide internal power and supply the appropriate power required for operating respective elements and components included in the mobile terminal 100. The power supply unit 190 may include a battery, which is typically rechargeable or be detachably coupled to the terminal body for charging.

Also, the power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Also, various embodiments can be implemented in the computer and similar recording materials using software, hardware and the combination of software and hardware.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal.

In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may be provided with the display unit 151, the 1st audio output unit 152a, the 2nd audio output unit 152b, the proximity sensor 141, the illumination sensor 142, the light output unit 154, the 1st camera 121a, the 2nd camera 121b, the 1st manipulating unit 123a, the 2nd manipulating unit 123b, the microphone 122, the interface unit 160, and the like.

FIGS. 1B and 1C depict certain components as arranged on the mobile terminal.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices.

Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b may also be commonly referred to as a manipulating portion, and may employ any tactile method that allows the user to perform manipulation such as touch, push, scroll, or the like.

The first and second manipulation units 123a and 123b may also employ any non-tactile method that allows the user to perform manipulation such as proximity touch, hovering, or the like.

As another example of the user input unit 123, a rear input unit (not shown) may be located on the rear surface of the terminal body.

The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121*b*. When an image of a subject is captured with the camera 121*b*, the flash 124 may illuminate the subject.

As shown in FIG. 1B, the second audio output module 152*b* can be located on the terminal body. The second audio output module 152*b* may implement stereophonic sound functions in conjunction with the first audio output module 152*a*, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160.

Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Meanwhile, in the present invention, it can be displayed using a flexible display. In the following, this will be discussed in more detail with attached drawings.

Figure 2:
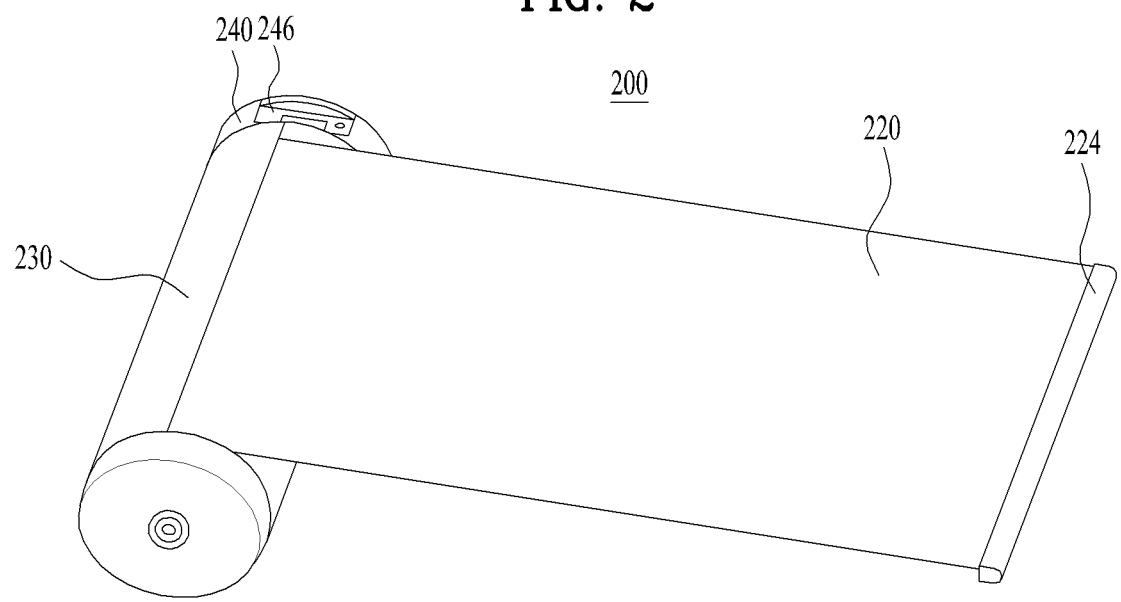
FIG. 2 is a perspective view of a terminal according to an embodiment of the present invention.
Figure 3A:
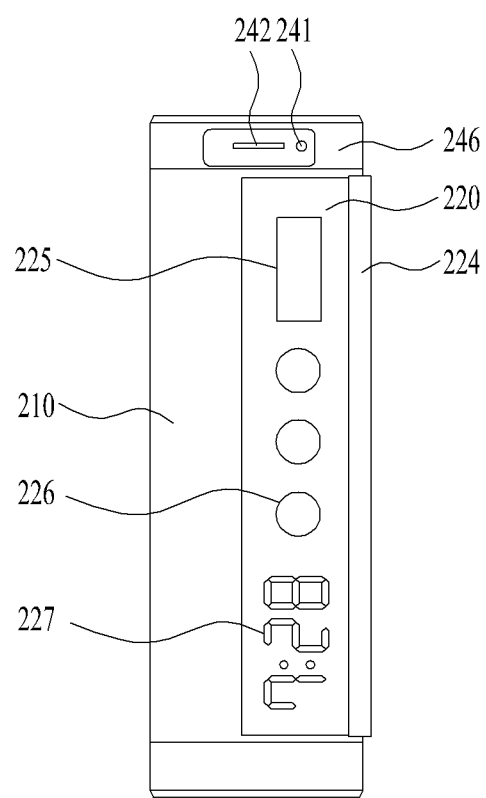
FIG. 3a is a diagram illustrating a first state of the terminal according to an embodiment of the present invention.
Figure 3B:
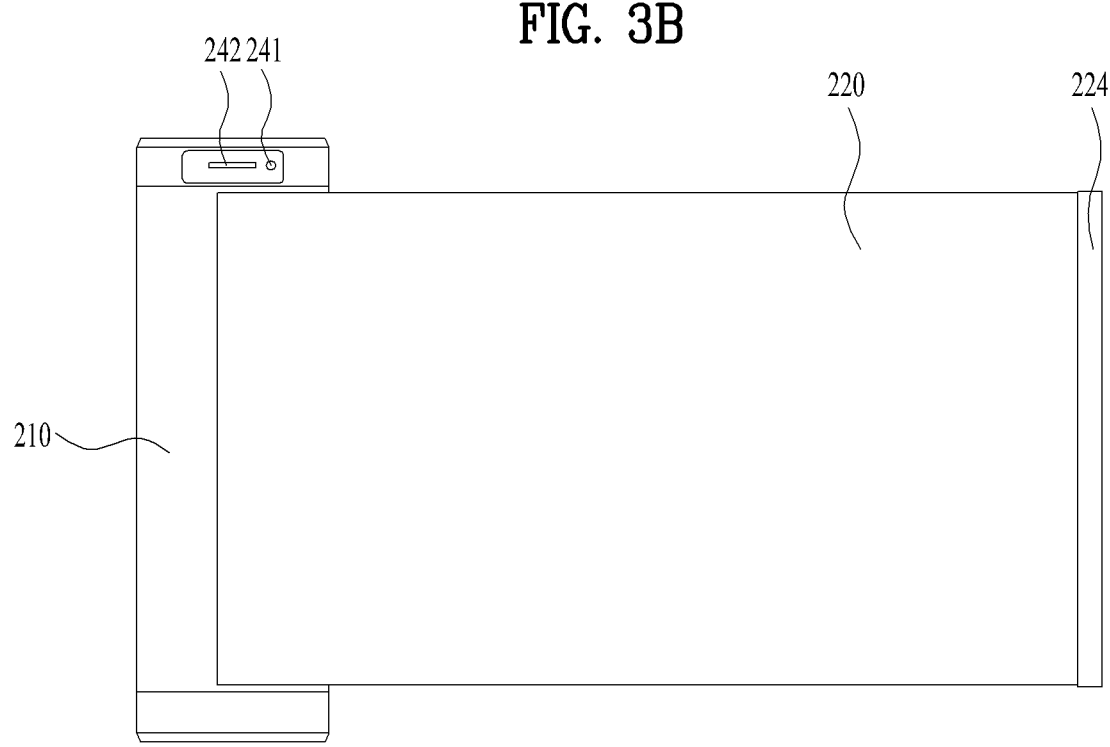
FIG. 3b is a diagram illustrating a second state of the terminal according to an embodiment of the present invention.

FIG. 2 is a perspective view of a terminal 200 according to an embodiment of the present invention, FIG. 3*a* is a diagram illustrating a first state of the terminal 200 according to an embodiment of the present invention, and FIG. 3*b* is a diagram illustrating a second state of the terminal 200 according to an embodiment of the present invention.

According to an embodiment of the present invention, provided is the terminal 200 that allows a user to easily adjust a display area for displaying a screen. In this case, the display area is configured to extend or reduce an area exposed to the outside by rolling. That is, the terminal 200 according to an embodiment of the present invention includes a body part 210 where various electronic components are mounted and a display unit 220 configured to be accommodated in the body part 210 in the first state and be exposed to the outside from the body part 210 in the second state.

In an embodiment of the present invention, the first state of the terminal 200 means an deactivated state of the terminal 200, that is, a state in which only a minimum display area is exposed to the outside such that the basic portion thereof is displayed. On the other hand, the second state of the terminal 200 means a state in which the display area is extended from the first state. In this case, the extension includes a step by step extension. The display area of the terminal 200 is extended or reduced by rolling the display unit 220. The extension or reduction may be performed by one-time rolling or gradually changing the display area step by step. Thus, all the states except the first state may be considered as the second state, and the second state can be divided into multiple stages.

The body part 210 includes a hollow intermediate case 230 having a first magnetic member provided therein, and a first case 240 and a second case (not shown in the drawing) formed at the top and bottom, which are formed separately from the intermediate case 230. As described above, the body part 210 is composed of three elements, and the first case 240, intermediate case 230, and second case forms the exterior appearance of the terminal 200. The intermediate case 230 is formed in a cylindrical shape, and the first case 240 and second case covers the intermediate case 230 from the top and bottom, respectively. The first case 240 and second case can protect various components provided within the intermediate case 230 without exposure to the outside. In an embodiment of the present invention, the magnetic member may be a magnet.

In addition, a holder 224, which is formed along a second direction, is provided at an outside end of the display unit 220 in order to prevent the display unit 220 from entering into the inside of the intermediate case 230. That is, the holder 224 is configured to be caught in a cleaved groove of the intermediate case 230 to prevent the display unit 220 from entering into the inside of the intermediate case 230.

Moreover, first and second speakers may be respectively provided in the first case 240 and second case, and speaker holes are respectively formed in the first and second speakers. According to an embodiment of the present invention, a dual speaker can be implemented by providing speakers at both ends of the intermediate case 230. Further, an antenna is provided in at least one of the first case 240 and second case.

Furthermore, in an embodiment of the present invention, a camera 241 and an audio output unit 242 can be installed in part of the first case 240 or second case. That is, referring to FIGS. 3*a* and 3*b*, the camera 241 and audio output unit 242 are provided at part of the outer surface of the first case 240 such that they face the same direction in the first and second states. As shown in FIGS. 3*a* and 3*b*, a recessed part 264, which is recessed toward the inside of the first case 240, may be formed on a flat surface rather than a curved surface, and the camera 241 and audio output unit 242 may be formed on the recessed part 246.

Further, in the first state, only a message window 225, an icon 226, and a time display portion 227 are displayed as shown in FIG. 3*a* in order to minimize an exposed area of the display unit 220. On the other hand, in the second state, the exposed area of the display unit 220 is maximized as shown in FIG. 3*b* so that a screen can be displayed on a larger area. The display unit 220 displays the message window 225, icon 226, and time display portion 227 in the basic state.

Figure 4:
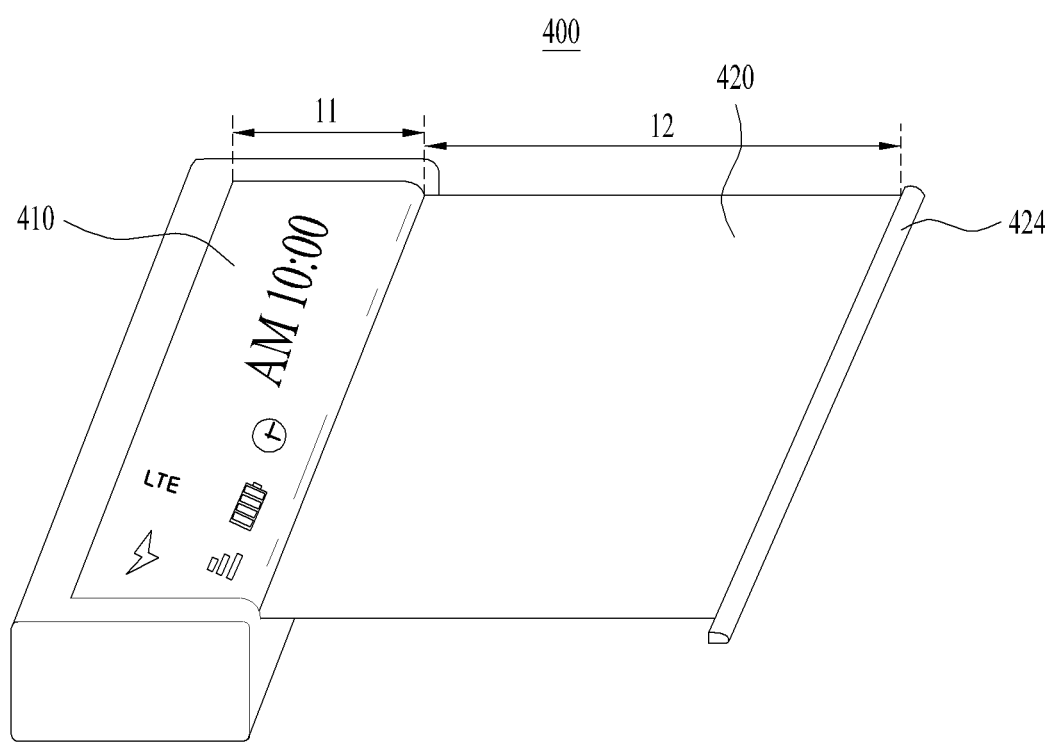
FIG. 4 is a perspective view of a terminal according to another embodiment of the present invention.

FIG. 4 is a perspective view of a terminal according to another embodiment of the present invention.

FIG. 4 shows that a terminal 400 with an indicating area extends a rollable display unit 420. The terminal 400 may include the rollable display unit 420 capable of being stored in a case and exposed from the case. The rollable display unit 420 can be rolled up to be stored in the case. Alternatively, the rollable display unit 420 can slide along the inner surface of the case to be stored in the case. If the width of the rollable display unit 420 is equal to or smaller than that of the case, the rollable display unit 420 can be stored in the case without deformation.

The rollable display unit 420 can be implemented as a flexible display. In addition, the rollable display unit 420 can be implemented as a transparent display. Meanwhile, the rollable display unit 420 may include a touch sensor layer so as to receive as an input a touch gesture on the rollable display unit 420. The touch sensor layer may be respectively disposed on both sides of the rollable display unit 420 so that it can receive as an input a touch gesture on the both sides thereof. Alternatively, a touch sensor layer capable of performing recognition on both sides thereof can be inserted into the middle of the rollable display unit 420 so that the rollable display unit 420 can receive as an input a touch gesture on its both sides.

A holder 424, which is formed along the second direction, is provided at an outside end of the rollable display unit 420 in order to prevent the rollable display unit 420 from entering into the inside of an intermediate case. That is, the holder 424 is configured to be caught in a cleaved groove of the intermediate case to prevent the rollable display unit 420 from entering into the inside of the intermediate case.

The terminal 100 can be implemented in various ways. For example, the terminal 100 may include a transparent cover 410 on one side of the case, and the rollable display unit 420 may be disposed under the transparent cover 410. By doing so, a user can see a partial area of the rollable display unit 420 through the transparent cover 410. For example, the transparent cover 410 may be made of materials such as transparent plastic, transparent glass, etc.

That is, the partial area of the rollable display unit 420 can be exposed through the transparent cover 410 at all times. Specifically, when the rollable display unit 420 is stored in the case, the partial area of the rollable display unit 420 is displayed through the transparent cover 410. In this case, the partial area of the rollable display unit 420, which is exposed through the transparent cover 410, can be referred to an indicating area 11. Time information, indicating information, alarm information, etc. can be displayed in the indicating area 11. In addition, when the rollable display unit 420 is extended from the case, the rollable display unit 420 can be divided into the indicating area 11 corresponding to the partial area exposed through the transparent cover 410 and an extension area 12 that can be directly touched by the user, separated from the transparent cover 410.

The user can control the indicating area 11 by inputting a gesture on the transparent cover 410. For example, the terminal 400 may include a proximity sensor in order to receive a gesture inputted through the transparent cover 410. In addition, the terminal 400 may control the indicating area 11 according to the recognized gesture.

When the rollable display unit 420 is extended while being stored, the physical or absolute indicating area can be extended out of the transparent cover 410 so that it can become the extension area 12. In an embodiment, the terminal 400 may include a sensing unit at an end of the transparent cover 410 to sense the area of the rollable display unit 420, which is covered by the transparent cover 410. The terminal 400 can display items, which was displayed in the indicating area before the extension, on the extended indicating area 11. Thus, the terminal 400 can display indicating information and the like in the indicating area 11 always covered by the transparent cover 410.

In another embodiment, the terminal 100 may include a sub display unit 410 on one side surface of the case. The sub display unit 410 can be implemented as a flexible or fixed display. The sub display unit 410 can receive as an input a touch gesture on the surface thereof. In addition, the sub display unit 410 can be configured as the indicating area 11 so that it can display indicating information, time information, alarm information, and the like.

Figure 5:
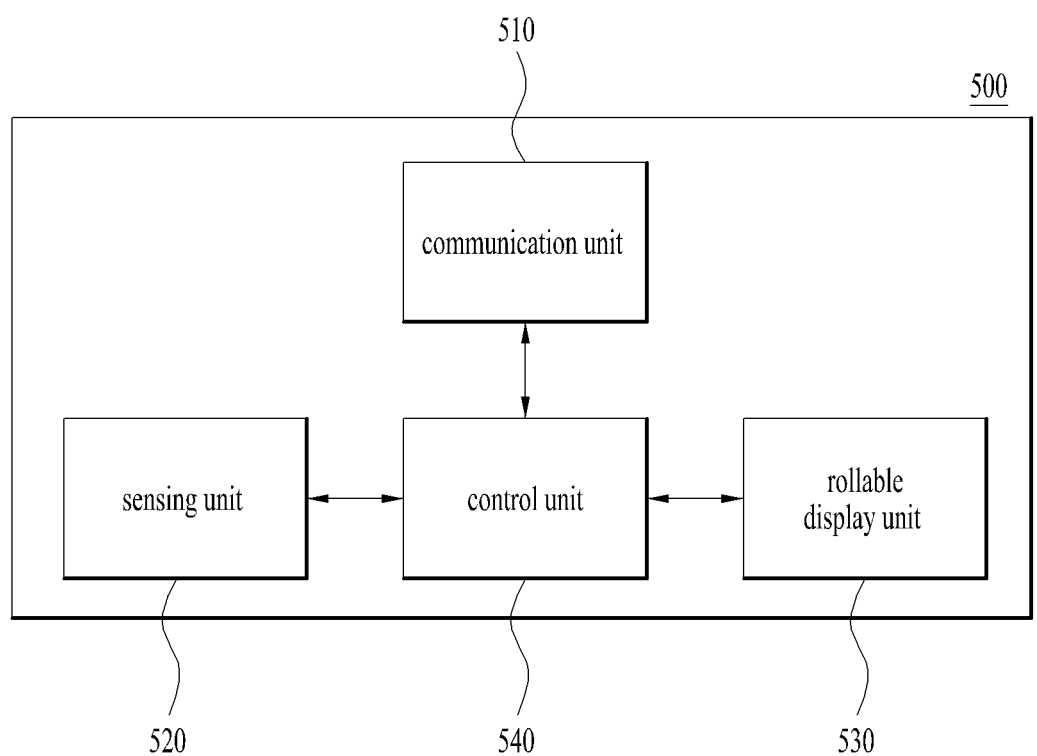
FIG. 5 is a block diagram of a terminal according to an embodiment of the present invention.

FIG. 5 is a block diagram of a terminal according to an embodiment of the present invention.

Referring to FIG. 5, a terminal 500 may include a communication unit 510, a sensing unit 520, a rollable display unit 530, and a controller 540. However, since this configuration is not mandatory, the terminal 500 may include more or fewer components depending on embodiments. In addition, one component shown in FIG. 5 may be implemented as two or more components, or two or more components shown in FIG. 5 may be implemented as one component. A controller 540 can include a control unit 540.

The communication unit 510 can perform communication with an external device. For example, the communication unit 510 can receive a call, a text message, information, etc. from the external device. In addition, the sensing unit 520 can detect a gesture inputted through a transparent display cover.

The rollable display unit 530 can be stored in a housing and exposed from the housing. In addition, when the rollable display unit 530 is stored in the housing, an indicating area can be exposed to the outside through the transparent display cover. The indicating area of the rollable display unit 530 may display indicating information. For example, the indicating information may include battery information, communication network information, signal strength information, etc.

When data is received by the communication unit 510, the controller 540 can control the rollable display unit 530 to display notification information on the received data in the indicating area. For example, when there is a missed call, the controller 540 may control the rollable display unit 530 to display notification information on the missed call in the indicating area of the rollable display unit 530. The rollable display unit 530 may display a missed call icon in the indicating area.

In addition, when the rollable display unit 530 is extended by a first predetermined length or more, the controller 540 may move the displayed notification information to an extended first area. When the rollable display unit 530 is extended by the first predetermined length or more, the controller 540 may know that the first area is generated. In the indicating area, the basic indicating information such as battery information may be displayed as described above. When there is a missed call, a missed call icon may be displayed in the indicating area. When a talk message is received, a talk icon may be displayed in the indicating area. When determining that the first area is generated (or extended), the controller 540 may move the notification information displayed in the indicating area into the first area. The rollable display unit 530 may delete the notification information displayed in the indicating area and then display it in the extended first area.

Figure 6:
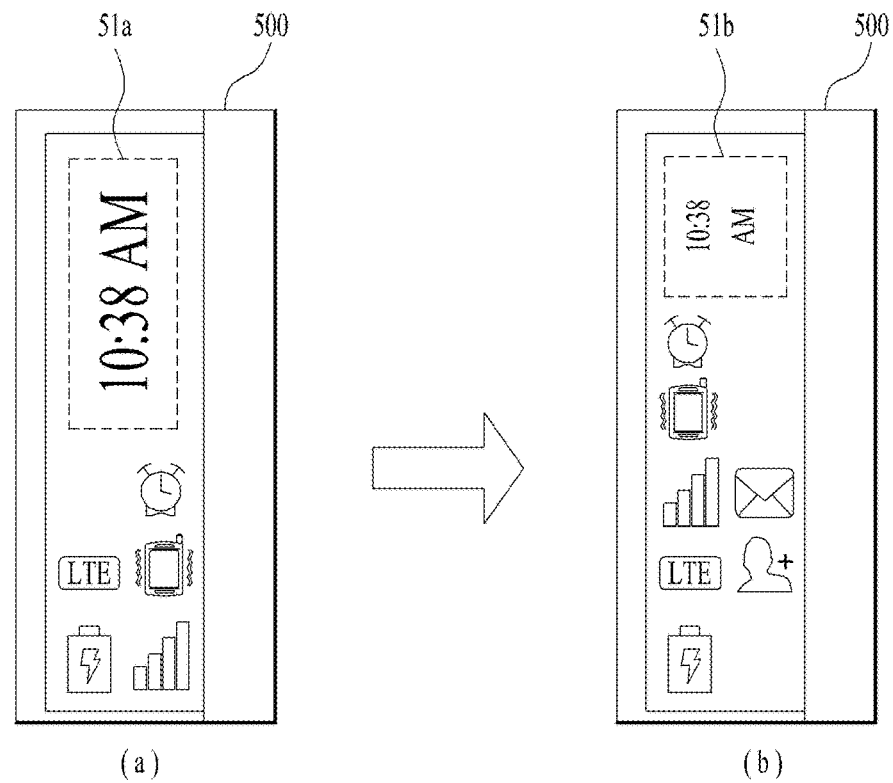
FIG. 6 is a diagram illustrating an embodiment of changing time information size.

FIG. 6 is a diagram illustrating an embodiment of changing the size of the time information.

FIG. 6(a) shows that the terminal 500 has no displayed notification information. The terminal 500 may include the indicating area for displaying indicating information, notification information, etc. As a part of the rollable display unit, the indicating area can be exposed through the transparent cover. In addition, when the rollable display unit is extended, the indicating area of the rollable display unit can be changed as a physical area. In other words, the user can see the indicating information through the area covered by the transparent cover regardless of whether the rollable display unit is extended. In some cases, the terminal 500 may include the sub display unit, and in this case, the sub display unit may correspond to the indicating area.

Referring to FIG. 6(a), only the indicating information is displayed without any notification information in the indicating area. That is, since there is a large space where time information 51a can be displayed, the time information 51a may be enlarged and then displayed. In other words, the terminal 500 may determine the size of the time information 51a by considering space in the indicating area.

FIG. 6(b) shows that the terminal 500 displays notification information. The terminal 500 can receive data from an external device and display the notification information related to the received data in the indicating area. When the terminal 500 displays the notification information in the indicating area 500, a space where time information 51b can be displayed may be reduced. Thus, the terminal 500 may reduce the size of the time information 51b. That is, the terminal may determine the size of the time information 51b by considering space in the indicating area based on whether the notification information to be displayed is present.

Figure 7:
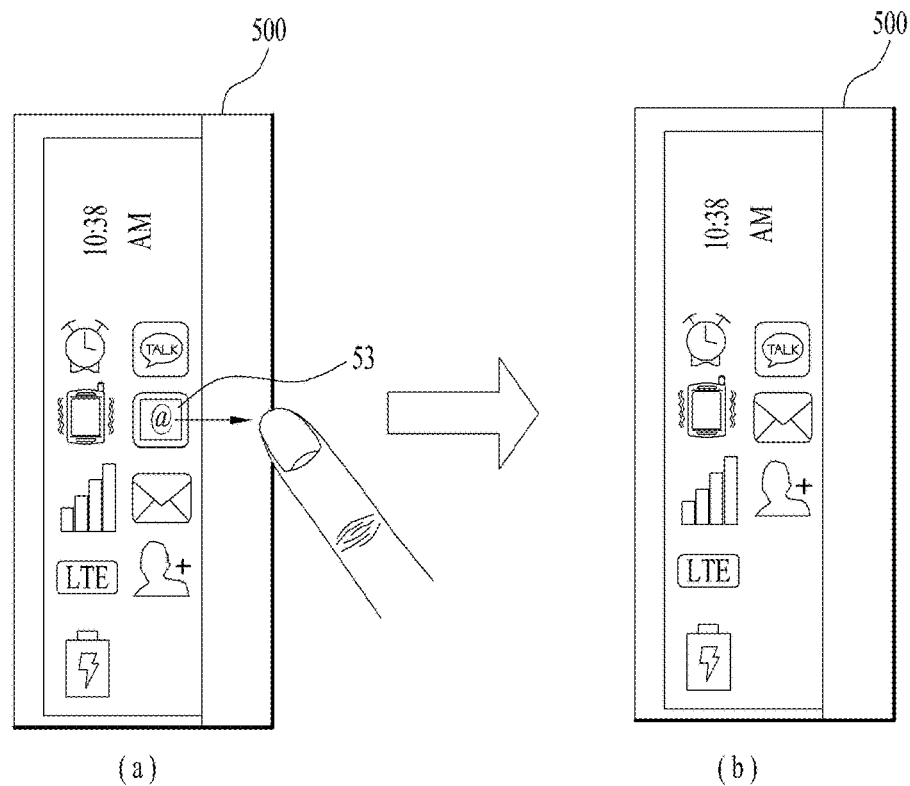
FIG. 7 is a diagram illustrating a first embodiment of changing display of an indicating area.

FIG. 7 is a diagram illustrating a first embodiment of changing the display of the indicating area.

FIG. 7(a) shows that the terminal 500 receives a swipe gesture as an input. The swipe gesture may mean a gesture of touching a point and moving the point in one direction while maintaining the touch. For example, the swipe gesture may include a drag gesture, a flicking gesture, and the like. When the indicating area is disposed under the transparent cover, the terminal 500 can detect a gesture of touching the transparent cover and moving thereon, calculate a coordinate thereof, and match the calculated coordinate with a corresponding coordinate in the indicating area. By doing so, the terminal 500 may consider a touch gesture inputted through the transparent cover to be identical to that inputted through in the indicating area of the rollable display unit. Meanwhile, when the terminal 500 includes the sub display unit, the indicating area may be a display area of the sub display unit.

In FIG. 7(a), it is illustrated that a touch gesture is inputted through the indicating area. When receiving data from the outside, the terminal 500 can display notification information in the indicating area. For example, when receiving a talk message, the terminal 500 may display a talk icon in the indicating area. When receiving an email, the terminal 500 may display an email icon in the indicating area. In this case, the user may input a swipe gesture on one piece of notification information. In an embodiment, the user may input a swipe gesture that moves from the left to the right of the email icon.

FIG. 7(b) shows that the terminal 500 deletes notification information. When receiving as an input a swipe gesture that moves to the left of the email icon, the terminal 500 may delete the email icon. That is, when receiving as an input a swipe gesture selecting notification information on the transparent cover and indicating area and moving the selected notification information in a first direction, the terminal 500 may delete the selected notification information. Alternatively, when receiving as an input a swipe gesture selecting notification information on the sub display unit and moving the selected notification information in the first direction, the terminal 500 may delete the selected notification information. If receiving as an input a swipe gesture moving in the first direction in the space where no notification information is displayed, the terminal 500 may delete all notification information displayed in the indicating area.

Figure 8:
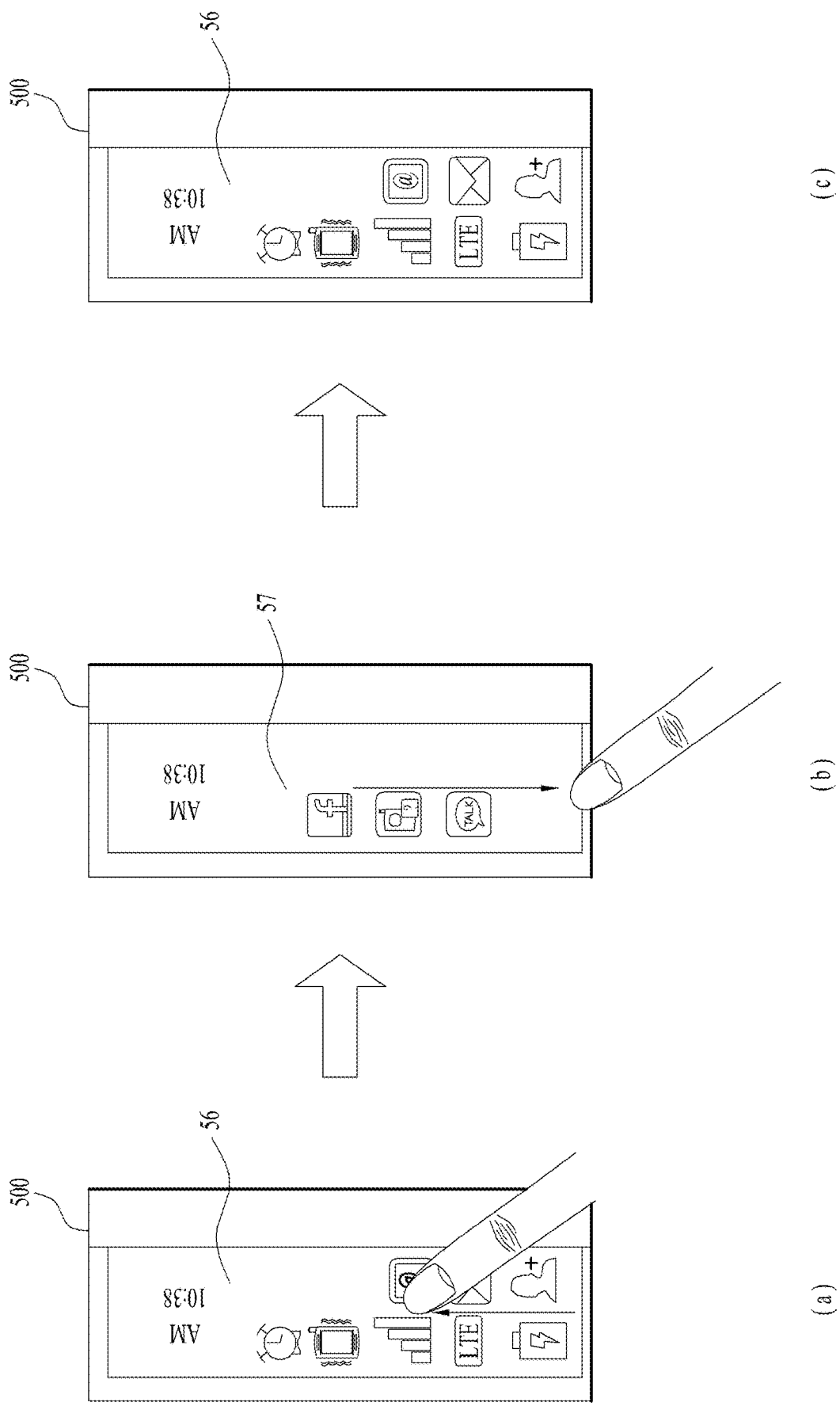
FIG. 8 is a diagram illustrating a second embodiment of changing the display of the indicating area.

FIG. 8 is a diagram illustrating a second embodiment of changing the display of the indicating area.

FIG. 8(a) shows that the terminal 500 receives as an input a swipe gesture moving in the second direction. In an embodiment, the second direction may be an upward direction. Upon receiving data from an external device, the terminal 500 may display relevant notification information. However, when receiving data after displaying a predetermined number of pieces of notification information, the terminal 500 may not display notification information related to the received data. In this case, the user may input the swipe gesture moving in the second direction.

FIG. 8(b) shows that the terminal 500 displays the non-displayed notification information. When the swipe gesture moving in the second direction is inputted, the terminal 500 may display the non-displayed notification information. That is, when there are many pieces of notification information, the terminal 500 may a plurality of pages for the indicating area. When the swipe gesture moving in the second direction is inputted, the terminal 500 may switch the current page from a first page 56 to a second page 57. For example, the second direction may a direction from the bottom to the top. If the terminal 500 has a third page set for notification information, when the terminal receives another swipe gesture moving in the second direction on the second page 57, the terminal 500 may switch from the second page 57 to the third page. In addition, when the terminal 500 receives as an input a swipe gesture moving in the direction opposite to the second direction on the second page 57 or third page, the terminal 500 may display the previous page.

FIG. 8(c) shows that the terminal 500 shows the initial indicating area. The user may input a swipe gesture moving in the direction opposite to the second direction on the second page for the indicating area. The terminal 500 may display the first page 56 for the indicating area in response to the inputted swipe gesture.

Figure 9:
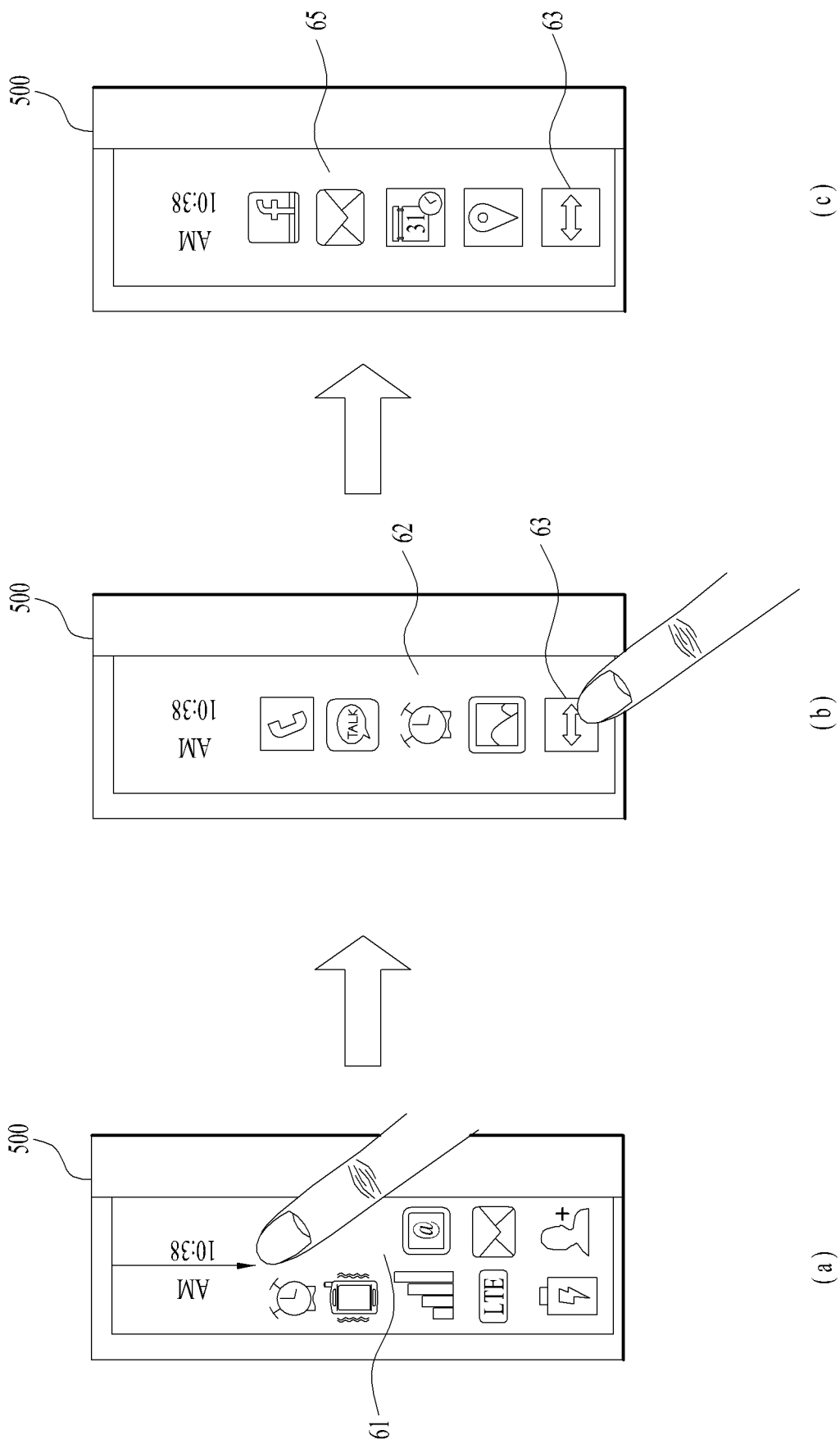
FIG. 9 is a diagram illustrating a third embodiment of changing the display of the indicating area.

FIG. 9 is a diagram illustrating a third embodiment of changing the display of the indicating area.

FIG. 9(a) shows that the terminal 500 receives as an input a swipe gesture moving in a third direction. Specifically, the terminal 500 may display an indicating page 61 including indicating information and notification information in the indicating area, and the user may input the swipe gesture moving in the third direction.

FIG. 9(b) shows that the terminal 500 displays a favorite page 62. The terminal 500 may receive the swipe gesture moving in the third direction. In this case, for example, the third direction may be a direction from the top to the bottom. When receiving the swipe gesture moving in the third direction, the terminal 500 may display the favorite page 62. The favorite page 62 may include frequently used application icons, which are configured by the user. Also, the favorite page 62 may include the switch button 63 for switching to a recently used application page 65. The user may select the switch button 63.

FIG. 9(c) shows the terminal 500 switches the current page to the recently used application page 65. When the switch button 63 is selected, the terminal 500 may switch its current page to the recently used application page 65. The recently used application page 65 may include icons of recently used applications. In addition, the recently used application page 65 may also include a switch button for switching to the favorite page 62. When the switch button 63 is selected, the terminal 500 may switch to the favorite page 62.

Meanwhile, when a swipe gesture moving in the third direction is inputted, the terminal 500 may switch to the recently used application page 65. When the switch button 63 is selected, the terminal 500 may switch to the favorite page 62.

Hereinabove, the embodiments for the indicating area have been described. In the following description, embodiments for extension areas will be explained.

Figure 10:
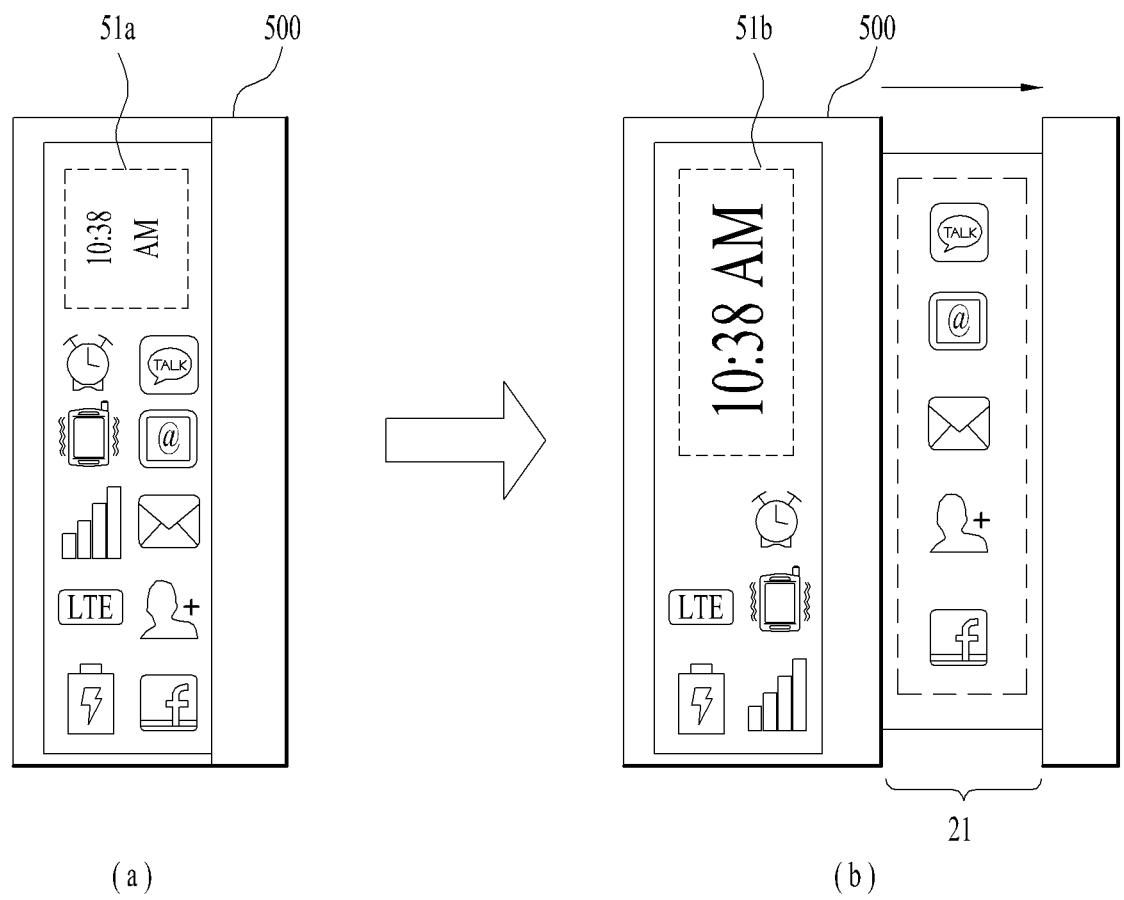
FIG. 10 is a diagram illustrating a first extension area according to an embodiment of the present invention.

FIG. 10 is a diagram illustrating a first extension area according to an embodiment of the present invention.

FIG. 10(a) shows that the terminal 500 displays notification information in the indicating area. As described above, when the terminal 500 displays the notification information in the indicating area, the terminal 500 can adjust the size of the time information 51a. The user may extend the rollable display unit using the holder.

FIG. 10(b) shows the terminal 500 has a first extension area 21. When the rollable display unit is extended by the first predetermined length or more, the terminal 500 can recognize the first extension area 21. When the terminal 500 includes a transparent cover, a physical indicating area may be the first extension area. However, the terminal 500 may set part of the rollable display unit located under the transparent cover as the indicating area. That is, the user may recognize the area under the transparent cover as the indicating area regardless of whether the rollable display unit is extended.

When recognizing the first extension area 21, the terminal 500 may move the notification information displayed in the indicating area into the first area 21. When the notification information is moved into the first area 21, the terminal 500 can enlarge the size of the time information 51b because space in the indicating area is increased.

Figure 11:
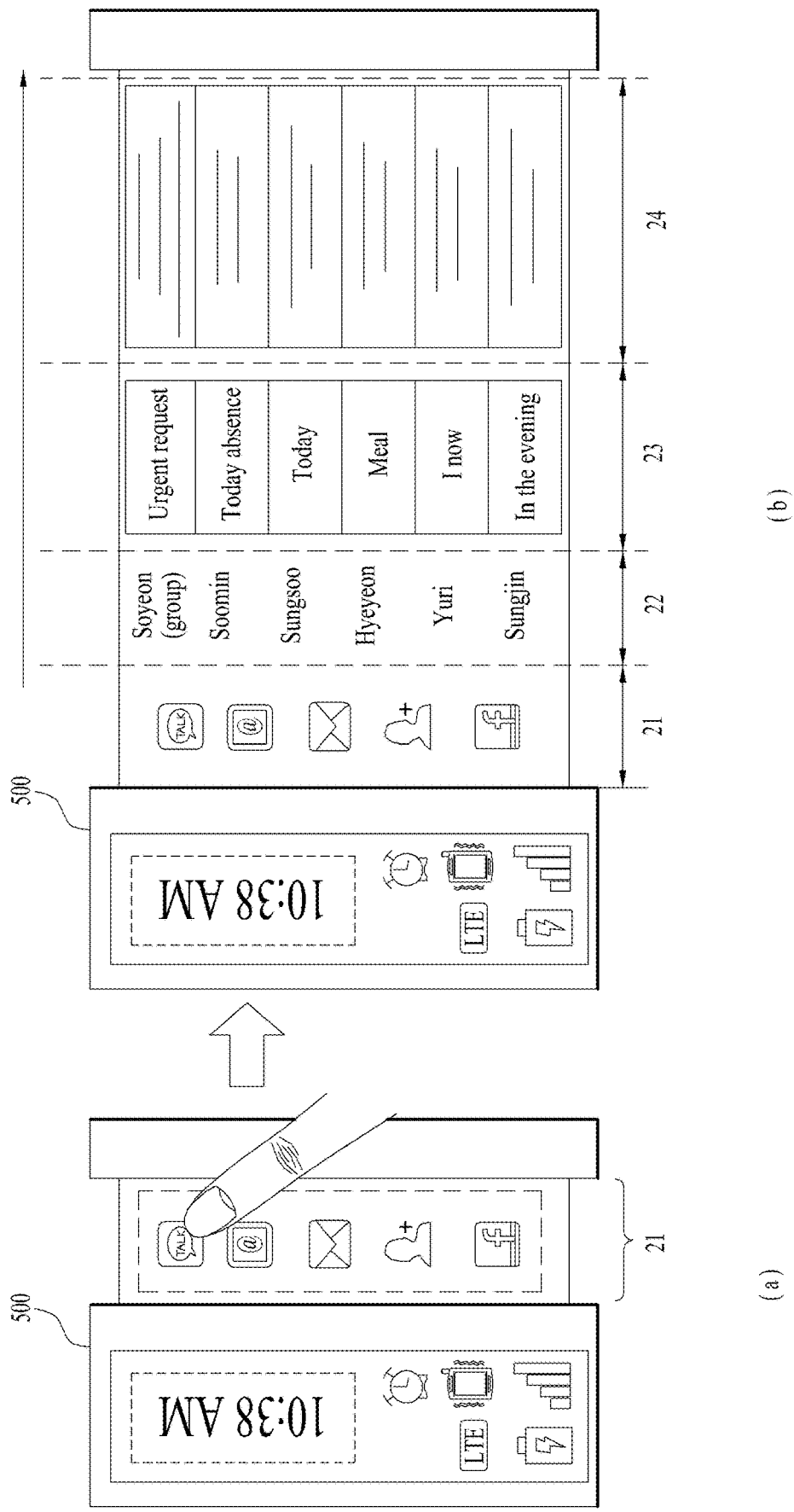
FIG. 11 is a diagram illustrating a first embodiment of displaying information step by step on a rollable display unit.

FIG. 11 is a diagram illustrating a first embodiment of displaying information step by step on a rollable display unit.

FIG. 11(a) shows that the terminal 500 has the first extension area 21. When the rollable display unit is extended to the first area 21, the terminal 500 can move notification information into the first area 21. The user may select the notification information displayed in the first area 21.

FIG. 11(b) shows that the terminal 500 is extended to a fourth extension area 24. When the rollable display unit is extended by the first predetermined length or more, the terminal 500 can recognize the first area 21. That is, the rollable display unit can be extended to the first area 21. In addition, when the rollable display unit is extended by a second predetermined length or more, which is greater than the first length, the terminal 500 can recognize a second area 22. That is, the rollable display unit can be extended to the second area 22. When the rollable display unit is extended by a third predetermined length or more, which is greater than the second length, the terminal 500 can recognize a third area 23. That is, the rollable display unit can be extended to the third area 23. When the rollable display unit is extended by a fourth predetermined length or more, which is greater than the third length, the terminal 500 can recognize a fourth area 24. That is, the rollable display unit can be extended to the fourth area 24. Although FIG. 11 shows the embodiment in which the four steps are configured for extension of the rollable display unit, the terminal 500 may change the extension steps of the rollable display unit, for example, configure three or five steps unlike the steps illustrated in FIG. 11.

Meanwhile, each of the first area 21, second area 22, third area 23, and fourth area 24 of the rollable display unit means a relative area rather than an absolute area. In other words, when the rollable display unit is initially extended, an area close to the holder of the rollable display unit may become the first area 21. When the rollable display unit is additionally extended, an area close to the holder may become the second area 22. That is, each of the first area 21 to the fourth area 24 mentioned in the present invention means a relative area from the perspective of the user rather than a physical area of the rollable display unit.

When the displayed notification information is selected and the rollable display unit is extended to the second area 22, the terminal 500 may launch an application related to the selected notification information. In addition, the terminal 500 may display first sub data of the launched application in the second extension area 22. In an embodiment, the user may select talk message notification information. In this case, the terminal 500 may launch a talk application and then display talk groups in the second area 22.

When the rollable display unit is extended to the third area 23, the terminal 500 may display second sub data, which is subordinate to the first sub data, in the third extension area 23. In an embodiment, the terminal 500 may display a summary message of each talk group, which is subordinate to the talk groups. When the rollable display unit is extended to the fourth area 24, the terminal 500 may display third sub data, which is subordinate to the second sub data, in the fourth extension area 24. In an embodiment, the terminal 500 may display a recent message, which is subordinate to the summary message.

That is, when the rollable display unit is extended more than a predetermined length, the terminal 500 can recognize a step corresponding to the extension length and then display sub data in the previous step in the corresponding extension area.

Figure 12:
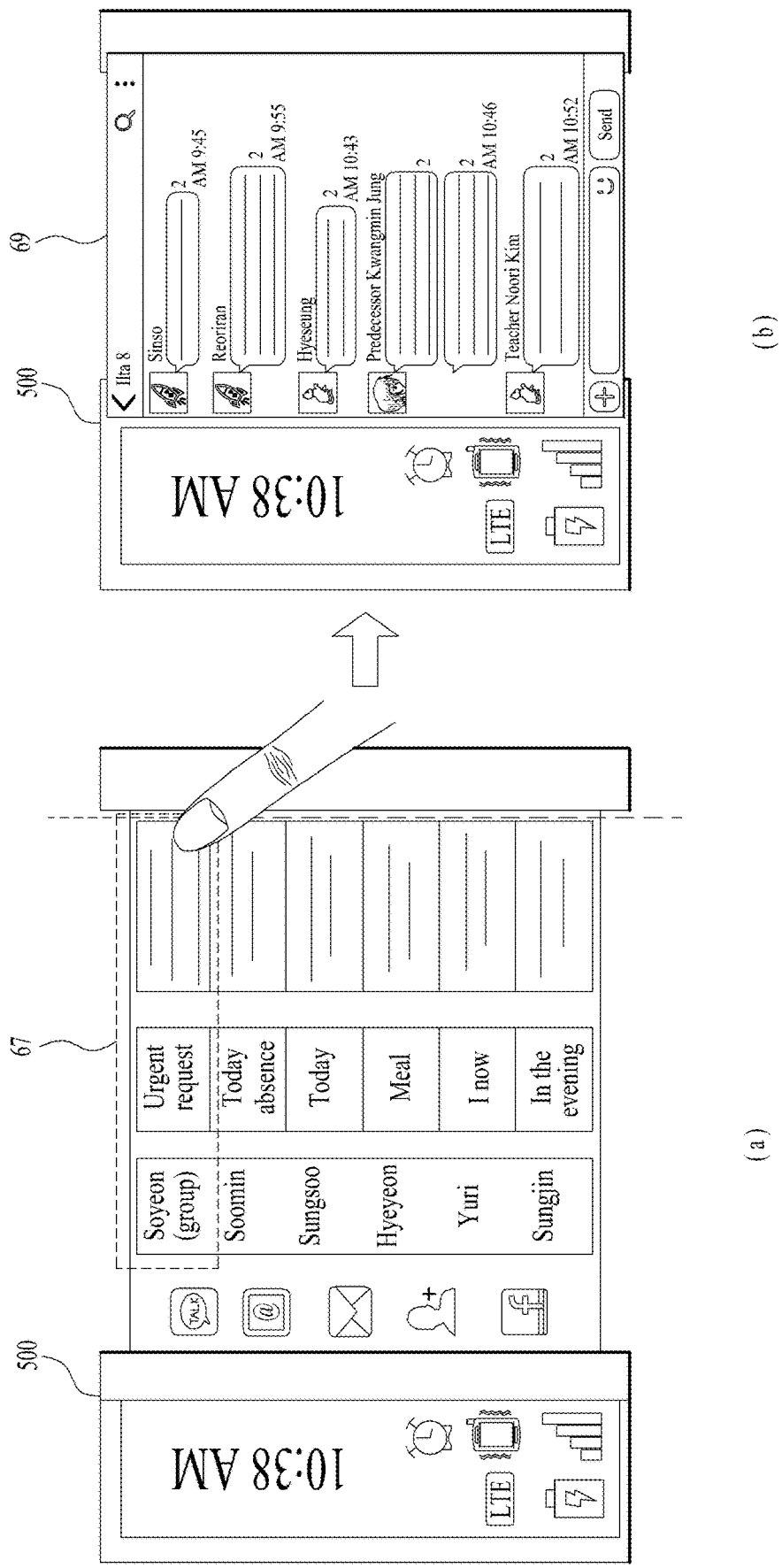
FIG. 12 is a diagram illustrating a first embodiment of displaying a selected item on the rollable display unit.

FIG. 12 is a diagram illustrating a first embodiment of displaying a selected item on the rollable display unit.

FIG. 12(a) shows the terminal 500 has a plurality of extension areas. As described above, the terminal 500 can move notification information in the indicating area into the first extension area and then launch an application related to the notification information selected by the user. In addition, according to the extension of the rollable display unit, the terminal 500 may display sub data of the launched application in each extension area. Meanwhile, the user may select the displayed sub data. For example, the user may select the sub data displayed in the second area, the sub data displayed in the third area, or the sub data displayed in the fourth area. In an embodiment, the user may select the sub data displayed in the second area after extending the rollable display unit to the second area or select the sub data displayed in the second area after extending the rollable display unit to the fourth area. In other words, the user may select sub data 67 regardless of extension areas, and the terminal 500 may display content of the selected sub data 67. The terminal 500 may operate in the same way when other areas are selected.

FIG. 12(b) shows that the terminal 500 displays the content of the selected sub data. The terminal 500 can display the content of the selected sub data 67 on the entirety of the rollable display unit. For example, when the user selects sub data related to a first talk group, the terminal 500 may display a chat window 69 of the first talk group.

FIG. 13 is a diagram illustrating an embodiment of displaying a home screen on the rollable display unit.

FIG. 13(a) shows that the rollable display unit 530 is extended to the first area. When the rollable display unit 530 is extended to the first area, the terminal 500 can move notification information into the first area. The user may not select the notification information.

FIG. 13(*b*) shows that the rollable display unit 530 is additionally extended. The rollable display unit 530 may be extended when any notification information is not selected. When the rollable display unit 530 is extended more than a predetermined length without selection of any notification information, the terminal 500 may display a predetermined screen. For example, the predetermined length may be the second length or the maximum extension length. In addition, the predetermined screen may be a home screen, a recently used screen, or a user configuration screen.

Figure 14:
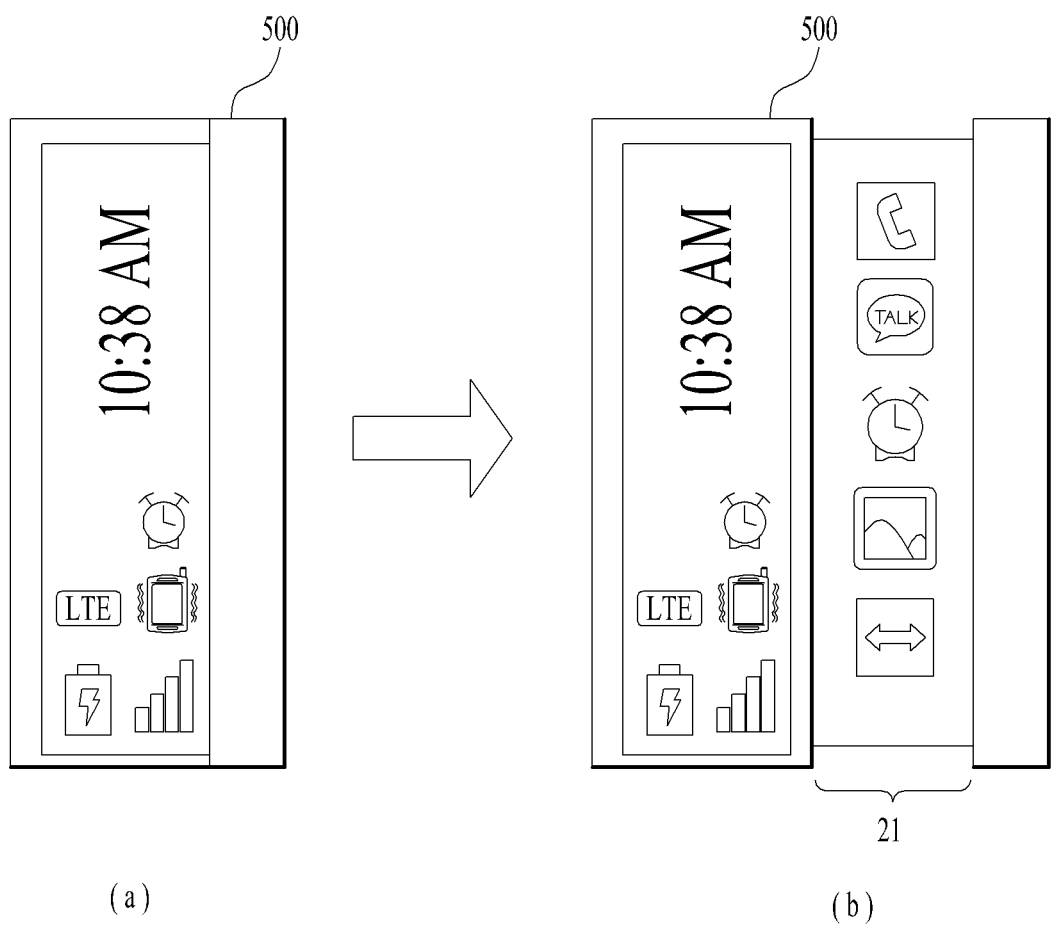
FIG. 14 is a diagram illustrating the first extension area according to another embodiment of the present invention.

FIG. 14 is a diagram illustrating the first extension area according to another embodiment of the present invention.

FIG. 14(*a*) shows that the terminal 500 displays no notification information in the indicating area. When there is no notification information displayed in the indicating area, the terminal 500 may enlarge the time information. The user may extended the rollable display unit using the holder.

FIG. 14(*b*) shows that the terminal 500 has the first extension area 21. When the rollable display unit is extended more than the first predetermined length, the terminal 500 can recognize the first extension area 21. When the terminal 500 recognizes the first extension area 21 without display of any notification information, the terminal 500 may display a list of recently used applications or a list of favorite applications in the first area 21.

Figure 15:
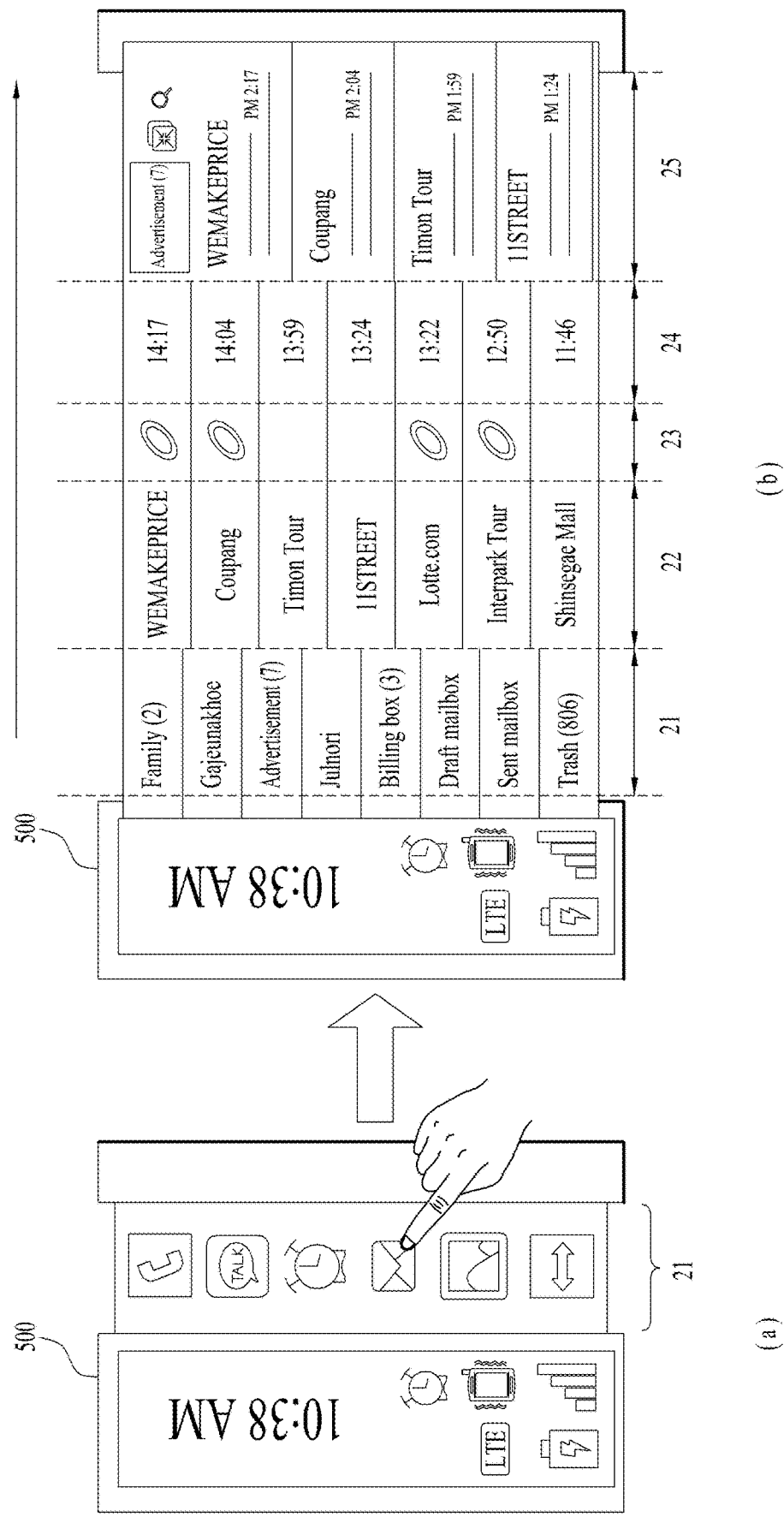
FIG. 15 is a diagram illustrating a second embodiment of displaying information step by step on the rollable display unit.

FIG. 15 is a diagram illustrating a second embodiment of displaying information step by step on the rollable display unit.

FIG. 15(*a*) shows that the terminal 500 has the first extension area 21. When the rollable display unit is extended to the first area 21 with no notification information, the terminal may display a list of recently used applications or a list of favorite applications in the first area 21. In this case, the user may select one application icon displayed in the first area 21.

FIG. 15(*b*) shows that the terminal 500 is extended to a fifth extension area 25. When the rollable display unit is extended by the first predetermined length or more, the terminal 500 can recognize the first area 21. That is, the rollable display unit can be extended to the first area 21. In addition, when the rollable display unit is extended by the second predetermined length or more, which is greater than the first length, the terminal 500 can recognize the second area 22. That is, the rollable display unit can be extended to the second area 22. When the rollable display unit is extended by the third predetermined length or more, which is greater than the second length, the terminal 500 can recognize the third area 23. That is, the rollable display unit can be extended to the third area 23. When the rollable display unit is extended by the fourth predetermined length or more, which is greater than the third length, the terminal 500 can recognize the fourth area 24. That is, the rollable display unit can be extended to the fourth area 24. When the rollable display unit is extended by a fifth predetermined length or more, which is greater than the fourth length, the terminal 500 can recognize the fifth area 25. That is, the rollable display unit can be extended to the fifth area 25.

When the application icon is selected, the terminal 500 can launch a corresponding application. The terminal 500 may display an application list in the first area 21. Alternatively, the terminal 500 may display first sub menus of the launched application in the first area 21. The user may select one of the first sub menus. When the rollable display unit is extended to the second area 22, the terminal 500 may display second sub data of the selected first sub menu. When the rollable display unit is extended to the third area 23, the terminal 500 may display third sub data, which is subordinate to the second sub data, in the third extension area 23. When the rollable display unit is extended to the fourth area 24, the terminal 500 may display fourth sub data, which is subordinate to the third sub data, in the fourth extension area 24. When the rollable display unit is extended to the fifth area 25, the terminal 500 may display fifth sub data, which is subordinate to the fourth sub data, in the fifth extension area 25.

Figure 16:
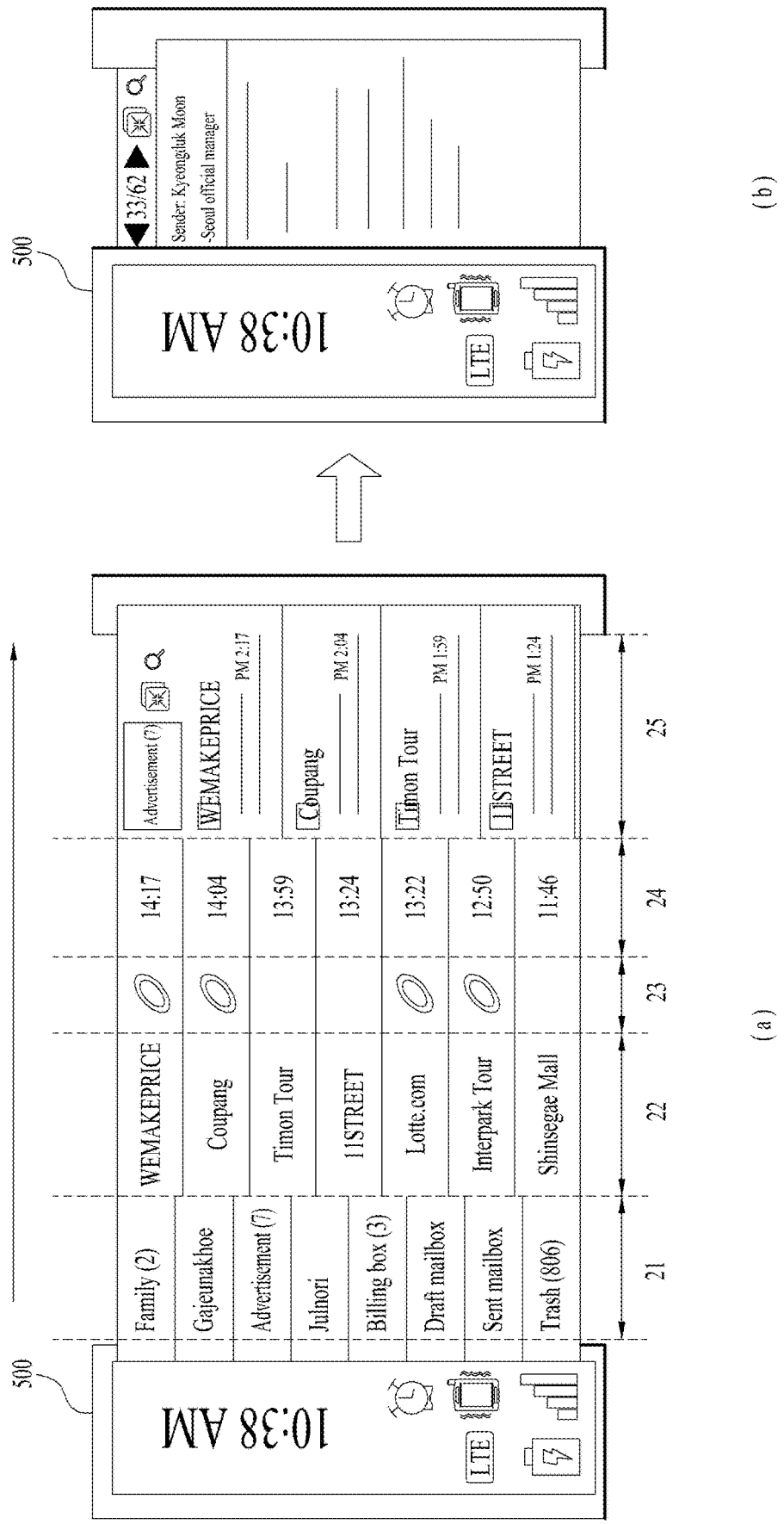
FIG. 16 is a diagram illustrating a second embodiment of displaying a selected item on the rollable display unit.

FIG. 16 is a diagram illustrating a second embodiment of displaying a selected item on the rollable display unit.

FIG. 16(*a*) shows that the terminal 500 is extended to the fifth area 25. When the rollable display unit is extended more than a predetermined length, the terminal 500 can recognize a step corresponding to the extension length and then display sub data in the previous step in the corresponding extension area. The user may select one of a plurality of pieces of displayed data.

FIG. 16(*b*) shows that the terminal 500 displays the selected content. The terminal 500 may display the selected content on the full screen of the rollable display unit. In an embodiment, when the user selects one of received emails, the terminal 500 may display the content of the selected email on the rollable display unit.

Figure 17:
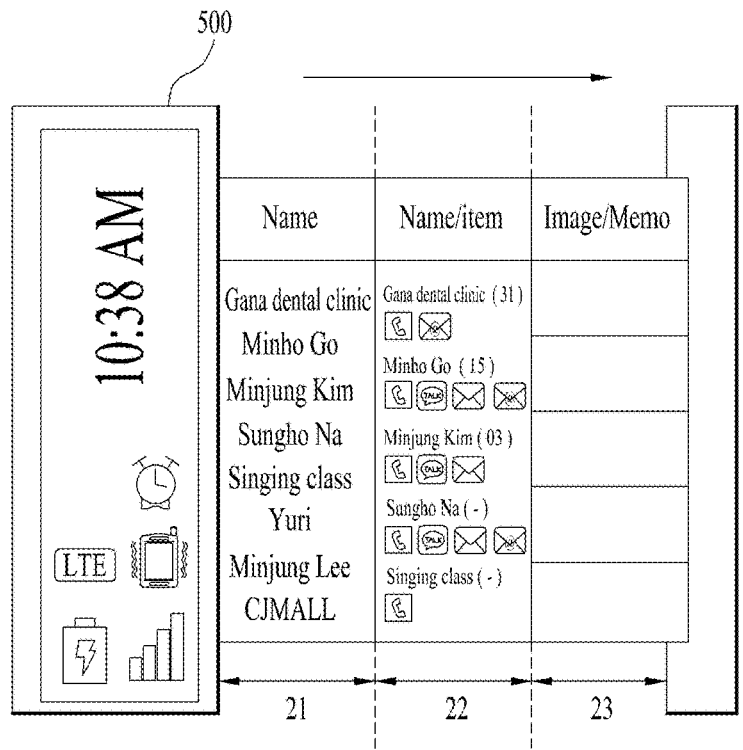
FIG. 17 is a diagram illustrating a third embodiment of displaying information step by step on the rollable display unit.

FIG. 17 is a diagram illustrating a third embodiment of displaying information step by step on the rollable display unit.

FIG. 17 shows that the terminal 500 displays data through several steps. In an embodiment, the user may execute a contact application. When the rollable display unit is extended to the first area 21, the terminal 500 may display name data. When the rollable display unit is extended to the second area, the terminal 500 may display data related to available contact methods together with the name data. That is, when the rollable display unit is extended, the terminal 500 may display sub data in addition to relevant superordinate data. When the rollable display unit is extended to the third area 23, the terminal 500 may display image or memo data.

Meanwhile, when one of the displayed data related to the available contact methods is selected, the terminal 500 may make a contact with the selected person using the selected contact method. In addition, when the rollable display unit is fully extended, the terminal 500 may display all detailed contact data.

Figure 18:
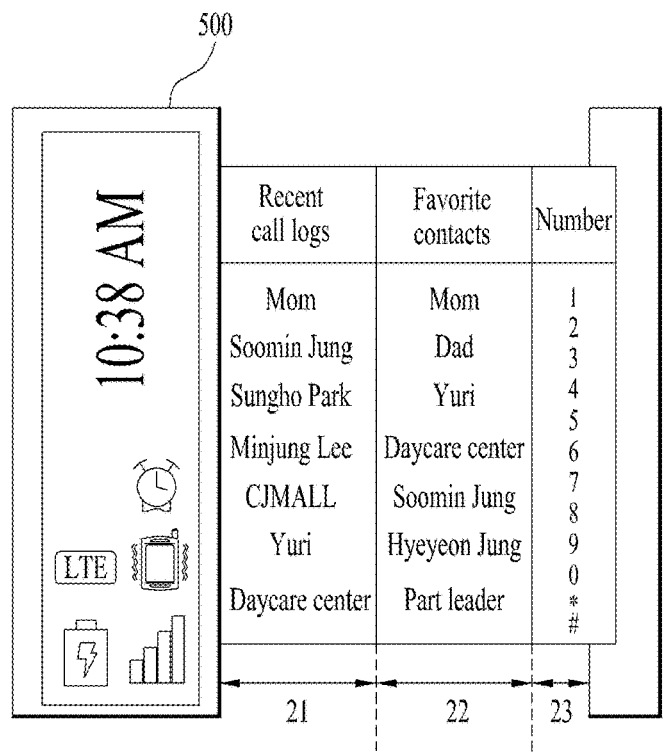
FIG. 18 is a diagram illustrating a fourth embodiment of displaying information step by step on the rollable display unit.

FIG. 18 is a diagram illustrating a fourth embodiment of displaying information step by step on the rollable display unit.

FIG. 18 shows that the terminal 500 displays data through several steps. In an embodiment, the user may execute a call log application. When the rollable display unit is extended to the first area 21, the terminal 500 may display a recent call list. When the rollable display unit is extended to the second area 22, the terminal 500 may display a frequent contact list. When the rollable display unit is extended to the third area 23, the terminal 500 may display a speed dial list. When one of the displayed items is selected, the terminal 500 may make a contact with the selected person. In the case of the data displayed through several steps, data in a certain step may be subordinate to data in the previous step or equivalent to the data in the previous step.

FIG. 19 is a diagram illustrating an embodiment of executing various menus in the second extension area of the rollable display unit.

FIG. 19(a) shows that the terminal 500 is extended to the first area 21. The terminal 500 can display the content of a selected application. In an embodiment, when the selected application is a map application, the terminal 500 may display content related to route search. In this case, the user may input the current location and destination and then extend the rollable display unit to the second area 22.

FIG. 19(b) shows that the terminal device 500 is extended to the second area 22. When the rollable display device is extended to the second area 22, the terminal 500 may display different content of the selected application in both the first area 21 and second area 22. In an embodiment, when the map application is executed, the terminal 500 may display content capable of calculating the shortest route.

FIG. 20 is a diagram illustrating an embodiment of executing various menus in the third extension area of the rollable display unit.

FIG. 20(a) shows that the terminal 500 is extended to the second area 22. As described above, when the rollable display unit is extended to the second area 22, the terminal 500 may display the different content of the selected application. In this case, the user may extend the rollable display unit to the third area.

FIG. 20(b) shows that the terminal 500 is extended to the third area 23. When the rollable display unit is extended to the third area 23, the terminal 500 may display further different content of the application across the first area 21, second area 22, and third area 23. In an embodiment, when the map application is executed, the terminal 500 may display content for finding a route using accessible means of transportation.

FIG. 21 is a diagram illustrating an embodiment of executing various menus in the fourth extension area of the rollable display unit.

FIG. 21(a) shows that the terminal 500 is extended to the third area 23. As described above, when the rollable display unit is extended to the third area 23, the terminal 500 may display content different from that in the previous step across the entirety of the first area 21, second area 22, and third area 23. In this case, the user may extend the rollable display unit to the fourth area.

FIG. 21(b) shows that the terminal 500 is extended to the fourth area 24. When the rollable display unit is extended to the fourth area 24, the terminal 500 may display content different from that in the previous step across the entirety of the first area 21, second area 22, third area 23, and fourth area 24. In an embodiment, when the map application is executed, the terminal 500 may display content for searching for a random route.

Figure 22:
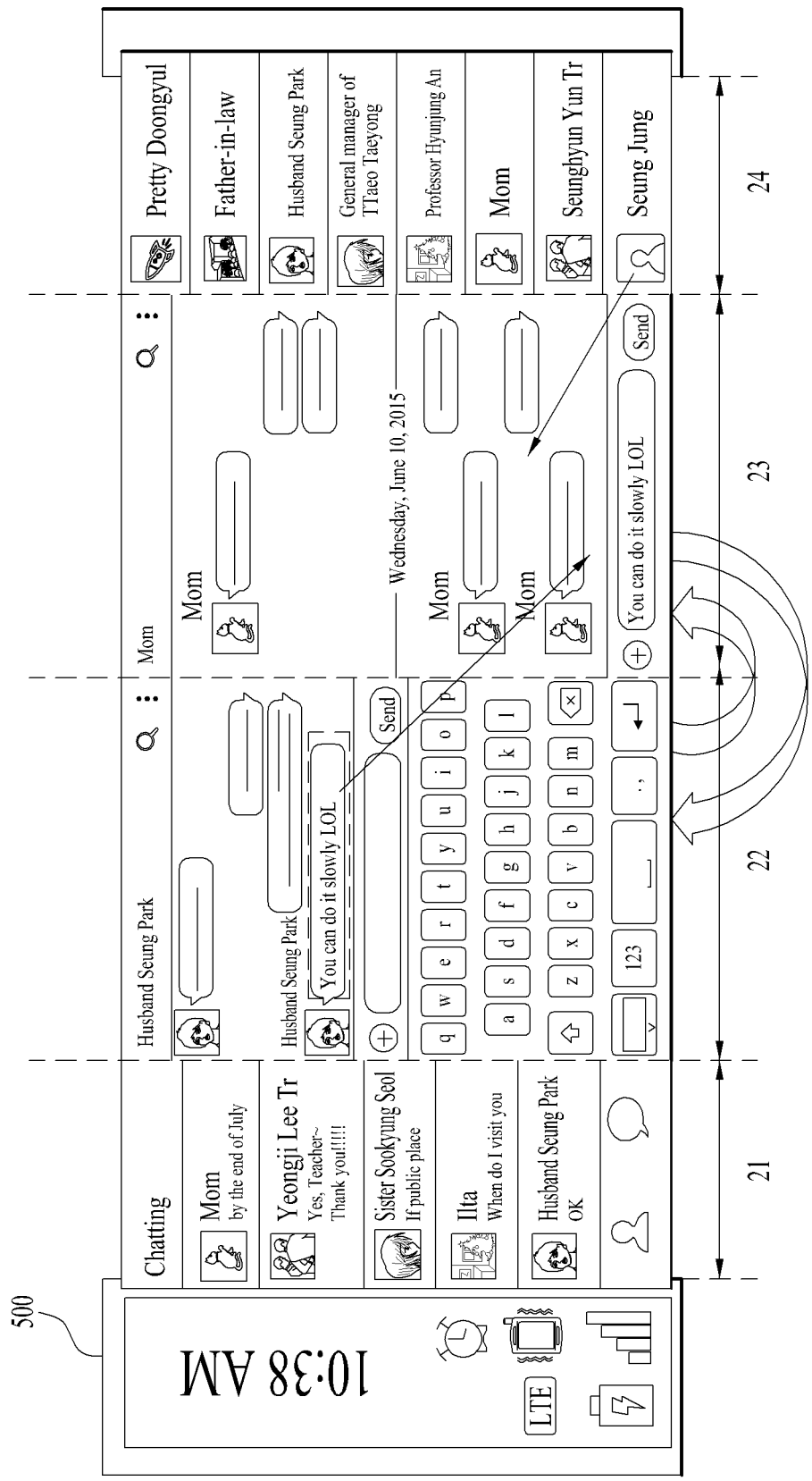
FIG. 22 is a diagram illustrating an embodiment of displaying a plurality of windows on the extended rollable display unit.

FIG. 22 is a diagram illustrating an embodiment of displaying a plurality of windows on the extended rollable display unit.

Meanwhile, the terminal 500 can display content through a plurality of windows rather than hierarchical data. For example, when the user executes the talk application, the terminal 500 may display a list of talk groups in the first area 21. When the rollable display unit is extended to the second area 22, the terminal 500 may display a selected talk window in the second area 22. The selected talk window may be a talk window selected by the user or a talk window with the most recent talk data. When the rollable display unit is extended to the third area 23, the terminal 500 may display a second talk window in the third area 23. When the rollable display unit is extended to the fourth area 24, the terminal 500 may display a third talk window in the fourth area 24. For example, the second and third talk windows may be determined in order of most recent talk data. Alternatively, when the rollable display unit is extended to the fourth area 24, the terminal 500 may display a chat contact list in the fourth area 24.

Upon receiving a swipe gesture, the terminal 500 may copy the text in the first talk window and paste it into the second talk window or add a person in the contact list. In addition, the positions of the first and second talk windows may be switched in the display order of talk data.

Hereinabove, various embodiments of the terminal have been described. In the following description, a method for controlling the terminal will be explained.

Figure 23:
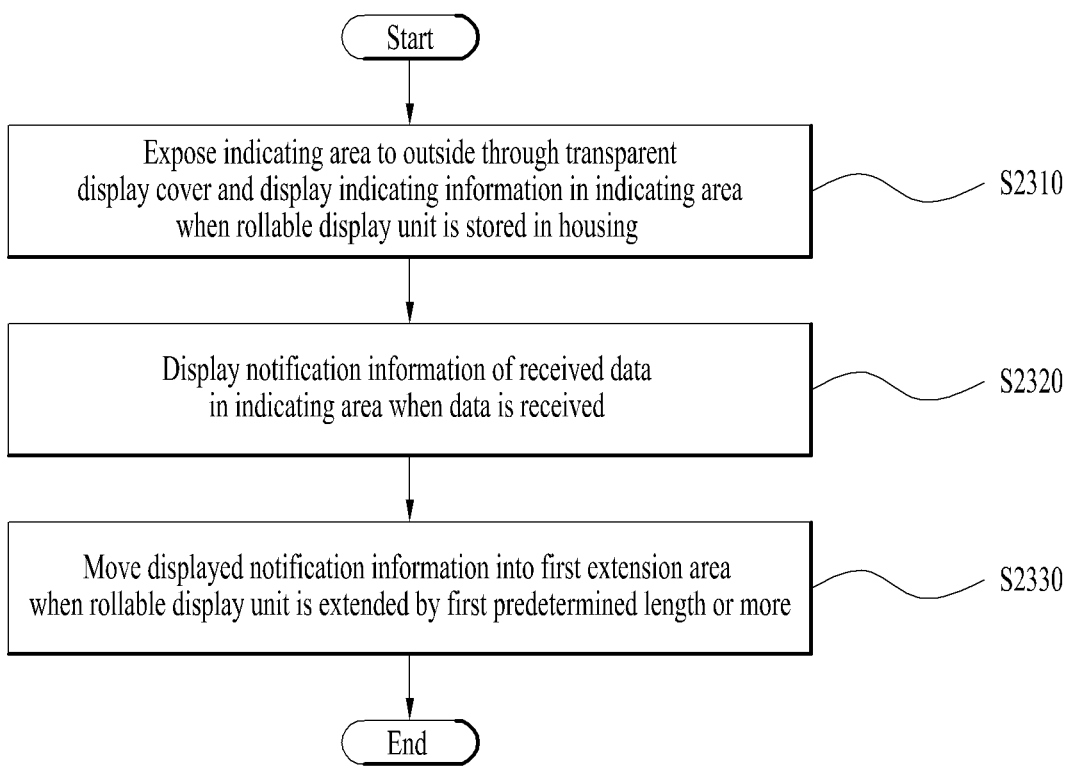
FIG. 23 is a flowchart for explaining a method for controlling the terminal according to an embodiment of the present invention.

FIG. 23 is a flowchart for explaining the method for controlling the terminal according to an embodiment of the present invention.

When the rollable display unit is stored in the housing, the terminal exposes the indicating area to the outside through the transparent display cover and displays indicating information in the indicating area S2310. The terminal may set an area under the transparent cover of the rollable display unit including the transparent cover as the indicating area. For example, the indicating information may include battery information, communication network information, signal strength information, etc. In addition, the terminal may display time information in the indicating area. Meanwhile, the terminal may include the sub display unit instead of the transparent cover, and in this case, the sub display unit may operate as the indicating area.

When receiving data, the terminal displays notification information of the received data in the indicating area [S2320]. For example, as information indicating information about message reception or information on a missed call, the notification information may be represented as an icon.

When the rollable display unit is extended by the first predetermined length or more, the terminal moves the displayed notification information into the first extension area [S2330]. In addition, when displayed notification information is selected and when the rollable display unit is extended by the second length or more, which is greater than the first length, the terminal may launch an application related to the selected notification information and then first sub data of the executed application in the second extension area. The terminal can display data step by step in response to the extension of the rollable display unit. In the case of data displayed step by step, data in a certain step may be subordinate to data in the previous step or extended data equivalent to the data in the previous step.

The above-described invention can be implemented in a program-recorded medium as computer-readable codes. The computer-readable media may include all kinds of recording devices in which data readable by a computer system are stored. The computer-readable media may include HDD (hard disk drive), SSD (solid state disk), SDD (silicon disk drive), ROM, RAM, CD-ROM, magnetic tapes, floppy disks, optical data storage devices, and the like, for example and also include carrier-wave type implementations (e.g., transmission via Internet). Further, the computer may include the controller 180 of the terminal device. Therefore, the above-mentioned embodiments are to be construed in all aspects as illustrative and not restrictive. The scope of the present invention should be determined by reasonable interpretation of the appended claims. In addition, the present invention covers the modifications and variations of this invention that come within the scope of the appended claims and their equivalents.

MODE FOR CARRYING OUT THE PRESENT INVENTION

The details have been described above in the best mode for carrying out the present invention.

INDUSTRIAL APPLICABILITY

The present invention has industrial applicability in that the terminal and control method therefor according to the invention can be applied to smartphones, wearable devices, and the like.

What is claimed is:

1. A terminal with a transparent display cover, the terminal comprising:
    a communication unit configured to perform communication with an external device;
    a rollable display configured to be stored in a housing and exposed from the housing;
    a sensor configured to sense gestures inputted on the transparent display cover; and
    a controller configured to control the communication unit, the rollable unit and the sensor,
    wherein when being stored in the housing, the rollable display is configured to expose an indicating area to the outside through the transparent display cover and display indicating information in the indicating area, and
    wherein the controller is configured to:
    when receiving data through the communication unit, control the rollable display to display notification information of the received data in the indicating area,
    when the rollable display is extended by a first predetermined length or more, move the displayed notification information into a first extension area,
    when the displayed notification information is selected and the rollable display is additionally extended from the first predetermined length or more by a second length or more having a second extension area, which is greater than the first predetermined length, execute an application related to the selected notification information, and
    control the rollable display to display first sub data of the executed application in the second extension area.

2. The terminal of claim 1, wherein when the rollable display is extended by a third length or more, which is greater than the second length, the controller is configured to control the rollable display to display second sub data subordinate to the first sub data in a third extension area.

3. The terminal of claim 2, wherein when the rollable display is extended by a fourth length or more, which is greater than the third length, the controller is configured to control the rollable display to display third sub data subordinate to the second sub data in a fourth extension area.

4. The terminal of claim 1, wherein the controller is further configured to:
    control the rollable display to display time information in the indicating area and,
    control the rollable display to display the time information by adjusting size of the time information when the notification information is displayed.

5. The terminal of claim 1, wherein when receiving as an input a swipe gesture selecting the notification information and then moving in a first direction in the indicating area and on the transparent display cover, the controller is configured to control the rollable display to delete the selected notification information.

6. The terminal of claim 1, wherein when receiving as an input a swipe gesture moving in a second direction in the indicating area and on the transparent display cover, the controller is configured to control the rollable display to display additional notification information that has not been displayed.

7. The terminal of claim 1, wherein when receiving as an input a swipe gesture moving in a third direction in the indicating area and on the transparent display cover, the controller is configured to control the rollable display to display a predetermined application list.

8. The terminal of claim 7, wherein the controller is further configured to:
    control the rollable display to display a list switch menu in the indicating area and,
    whenever the displayed list switch menu is selected, control the rollable display to display the predetermined application list and a recently used list in an alternate manner.

9. The terminal of claim 1, wherein when the rollable display is extended by a predetermined length or more without selection of the notification information, the controller is configured to control the rollable display to display a predetermined screen.

10. The terminal of claim 9, wherein the predetermined length is a maximum extension length of the rollable display, and
    wherein the predetermined screen is a home screen.

11. The terminal of claim 1, wherein when a predetermined application is selected and when the rollable display is extended by a second length or more, which is greater than the first predetermined length, the controller is configured to control the rollable display to display first content of the selected application in the first extension area and the second extension area.

12. The terminal of claim 11, wherein when the rollable display is extended by a third length or more, which is greater than the second length, the controller is configured to control the rollable display to display second content of the selected application in the first extension area to a third extension area.

13. The terminal of claim 12, wherein when the rollable display is extended by a fourth length or more, which is greater than the third length, the controller is configured to control the rollable display to display third content of the selected application in the first extension area to a fourth extension area.

14. A method of controlling a terminal with a transparent display cover, the method comprising:
    when a rollable display is stored in a housing, exposing an indicating area to the outside through the transparent display cover and displaying indicating information in the indicating area;
    when data is received, displaying notification information of the received data in the indicating area;
    when the rollable display is extended by a first predetermined length or more, moving the displayed notification information into a first extension area;
    when the displayed notification information is selected and the rollable display is additionally extended from the first predetermined length or more by a second length or more having a second extension area, which is greater than the first predetermined length, executing an application related to the selected notification information; and
    controlling the rollable display to display first sub data of the executed application in the second extension area.

15. The method of claim 14, further comprising, when a swipe gesture selecting the notification information and then moving in a first direction in the indicating area and on the transparent display cover is received as an input, deleting the selected notification information.

16. The method of claim 14, further comprising, when a swipe gesture moving in a second direction in the indicating area and on the transparent display cover is received as an input, displaying additional notification information that has not been displayed.

17. The method of claim 14, further comprising, when a swipe gesture moving in a third direction in the indicating area and on the transparent display cover is received as an input, displaying a predetermined application list.

18. The method of claim 14, further comprising, when the rollable display is extended by a predetermined length or more without selection of the notification information, displaying a predetermined screen.

\* \* \* \* \*